United States Patent
Tamatsu et al.

(10) Patent No.: US 6,317,073 B1
(45) Date of Patent: *Nov. 13, 2001

(54) FM-CW RADAR SYSTEM FOR MEASURING DISTANCE TO AND RELATIVE SPEED OF A TARGET

(75) Inventors: Yukimasa Tamatsu, Okazaki; Hiroaki Kumon, Kariya, both of (JP)

(73) Assignee: Denso Corporation, Kariya (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/390,316

(22) Filed: Sep. 7, 1999

(30) Foreign Application Priority Data

| Sep. 7, 1998 | (JP) | 10-252903 |
|---|---|---|
| Sep. 7, 1998 | (JP) | 10-252904 |
| Jun. 18, 1999 | (JP) | 11-173038 |

(51) Int. Cl.$^7$ ............. G01S 13/60; G01S 13/93
(52) U.S. Cl. ............. 342/70; 342/109; 342/114; 342/128
(58) Field of Search ............. 342/70, 109, 114, 342/128

(56) References Cited

U.S. PATENT DOCUMENTS

| 4,097,864 | 6/1978 | Endo et al. . |
| 5,270,720 | * 12/1993 | Stove .................. 342/174 |
| 5,619,208 | 4/1997 | Tamatsu et al. . |
| 5,731,778 | 3/1998 | Nakatani et al. . |
| 5,751,240 | 5/1998 | Fujita et al. . |
| 5,757,307 | 5/1998 | Nakatani et al. . |
| 5,815,112 | 9/1998 | Sasaki et al. . |
| 5,864,314 | * 1/1999 | Ashihara .................. 342/128 |
| 5,977,904 | 11/1999 | Mizuno . |
| 6,040,796 | 3/2001 | Matsugatani . |
| 6,097,331 | 8/2001 | Matsugatani . |

FOREIGN PATENT DOCUMENTS

| 52-124628 | 10/1977 | (JP) . |
| 2-287180 | 11/1990 | (JP) . |
| 5-40168 | 2/1993 | (JP) . |
| 5-232214 | 9/1993 | (JP) . |
| 6-207979 | 7/1994 | (JP) . |
| 6-317657 | 11/1994 | (JP) . |
| 7-98375 | 4/1995 | (JP) . |
| 7-151850 | 6/1995 | (JP) . |
| 7-191133 | 7/1995 | (JP) . |

OTHER PUBLICATIONS

"Automotive Radar R & D Report," Jul. 1993, pp. 52–83, 95–98 (w/partial English Translation).

U.S. application No. 08/744,967, filed Nov. 7, 1996, Hazumi

* cited by examiner

*Primary Examiner*—Ian J. Lobo

(57) ABSTRACT

An FM-CW radar is provided which may be employed in anti-collision systems or cruise control systems installed in moving objects such as automotive vehicles. The radar produces a first spectrum using a portion of a beat signal in a frequency rising range wherein the frequency of the radar wave increases and a second spectrum using a portion of the beat signal in a frequency falling range wherein the frequency of the radar wave decreases and moves the second spectrum by frequency shifts which are determined as a function of the speed of a radar-mounted vehicle and corrected for compensating various errors involved in measuring the speed of the vehicle to form spectrum groups each consisting of the frequency components moved by one of the corrected frequency shifts and frequency components in the other of the first and second spectra. The radar selects an optimum one of the spectrum groups for use in determining target data.

50 Claims, 17 Drawing Sheets

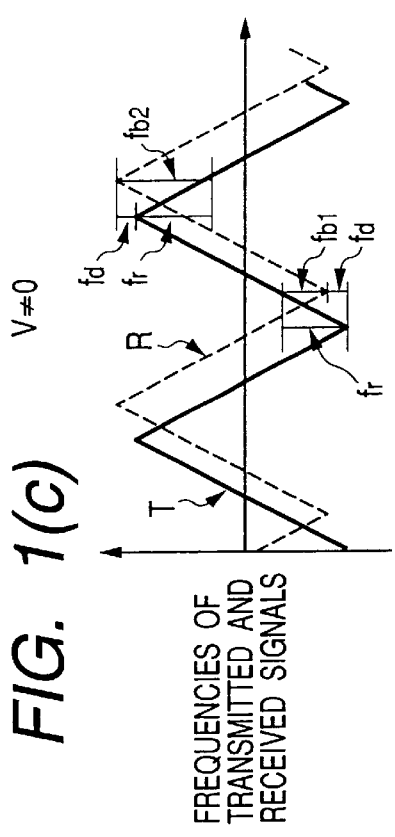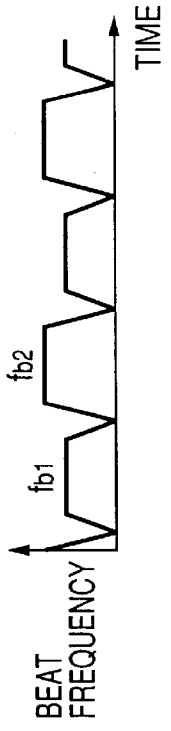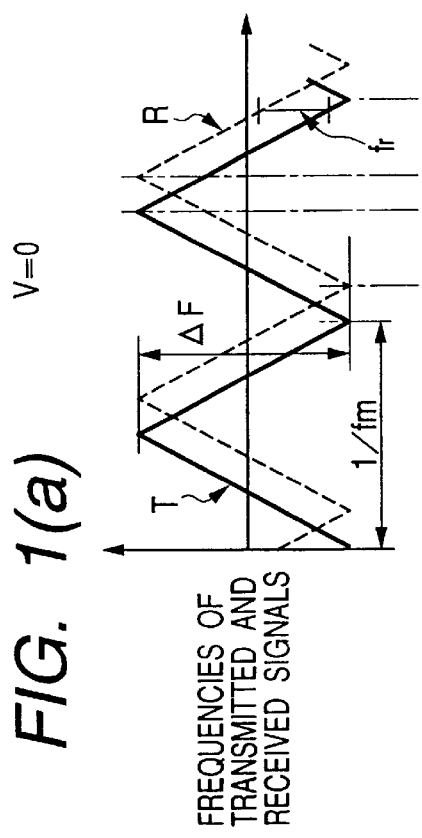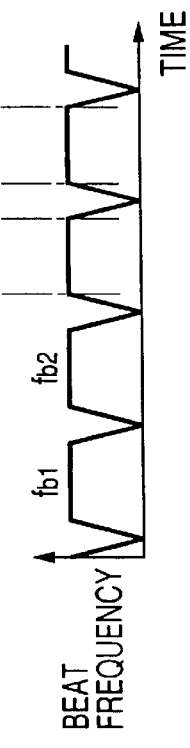

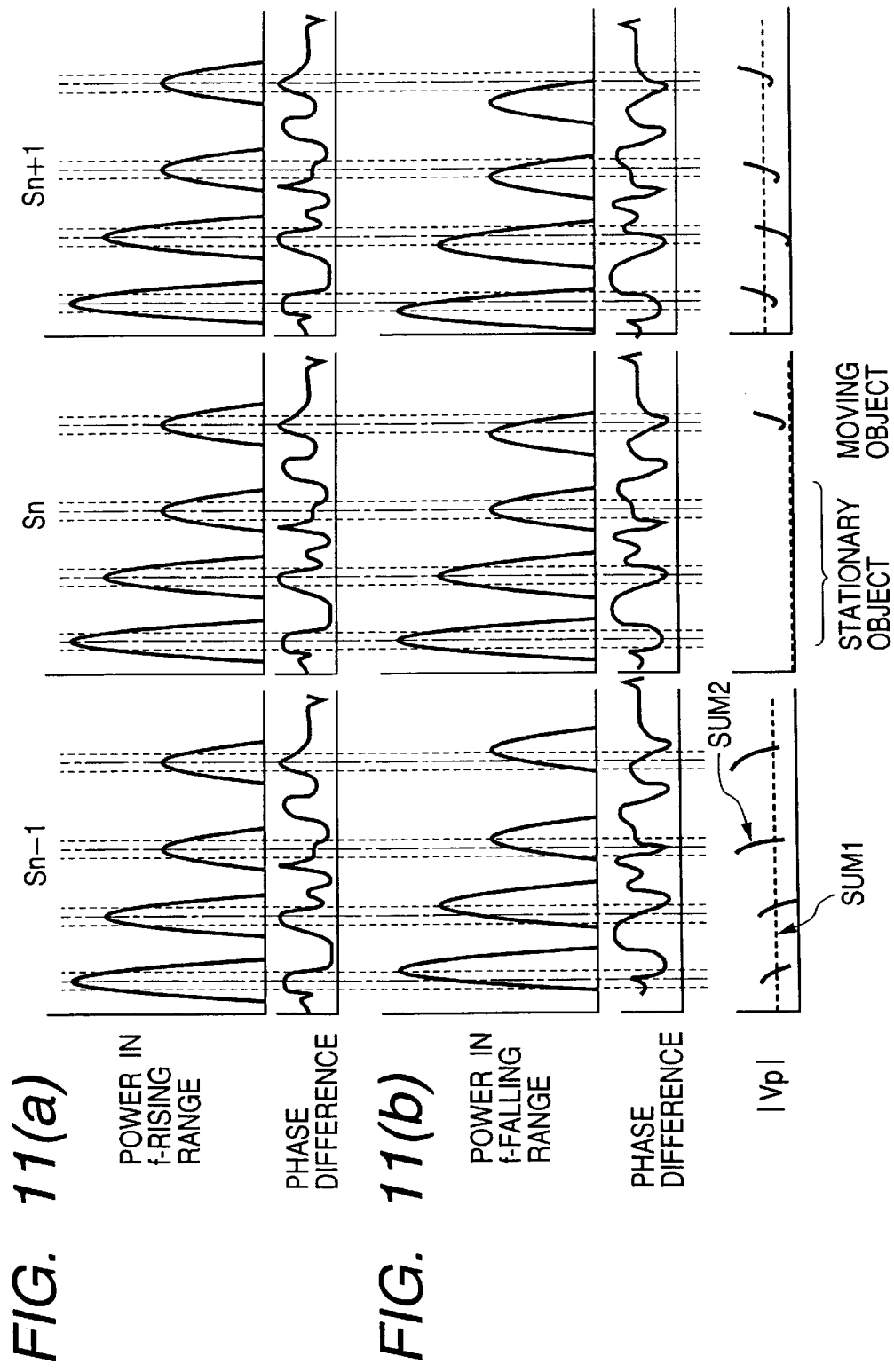

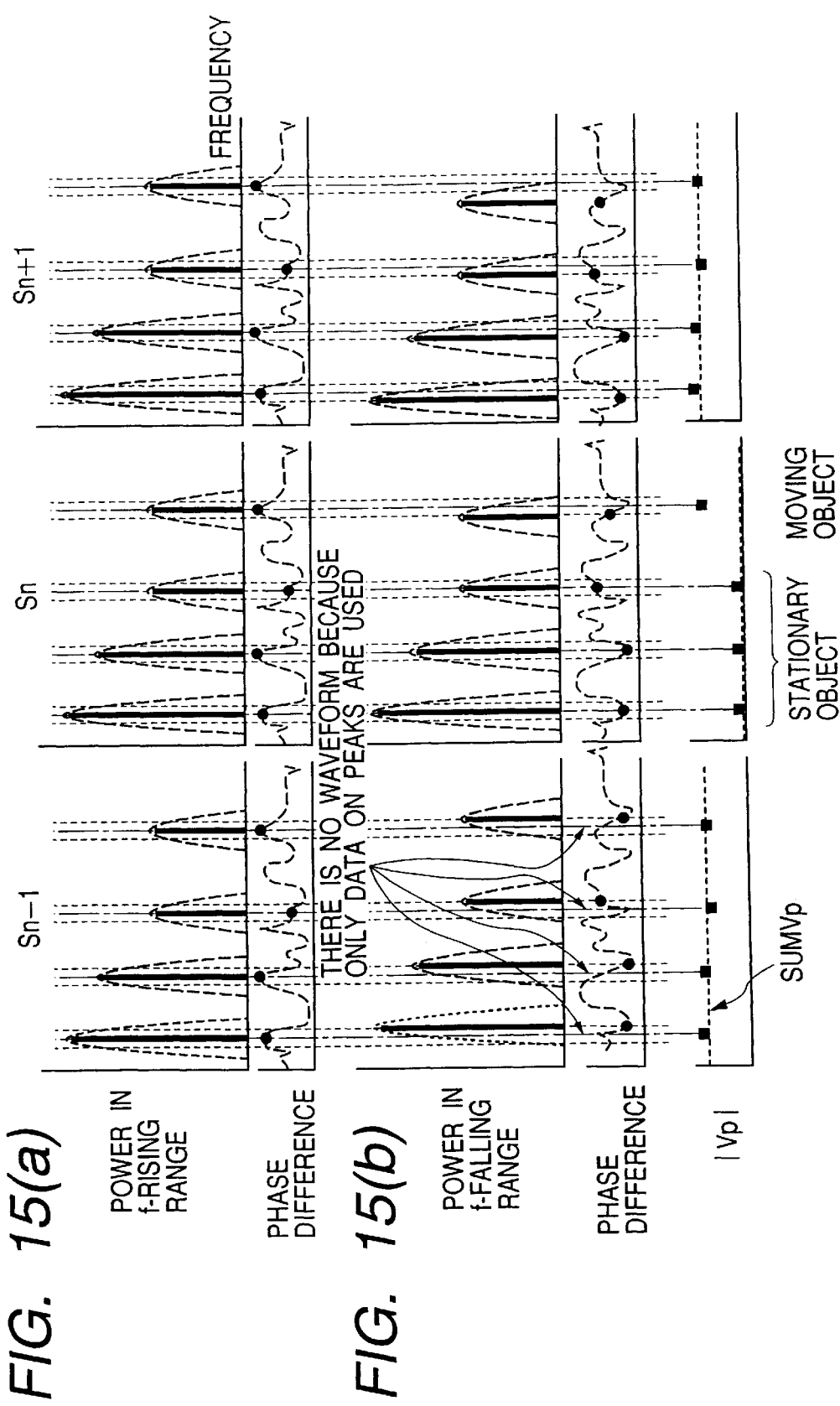

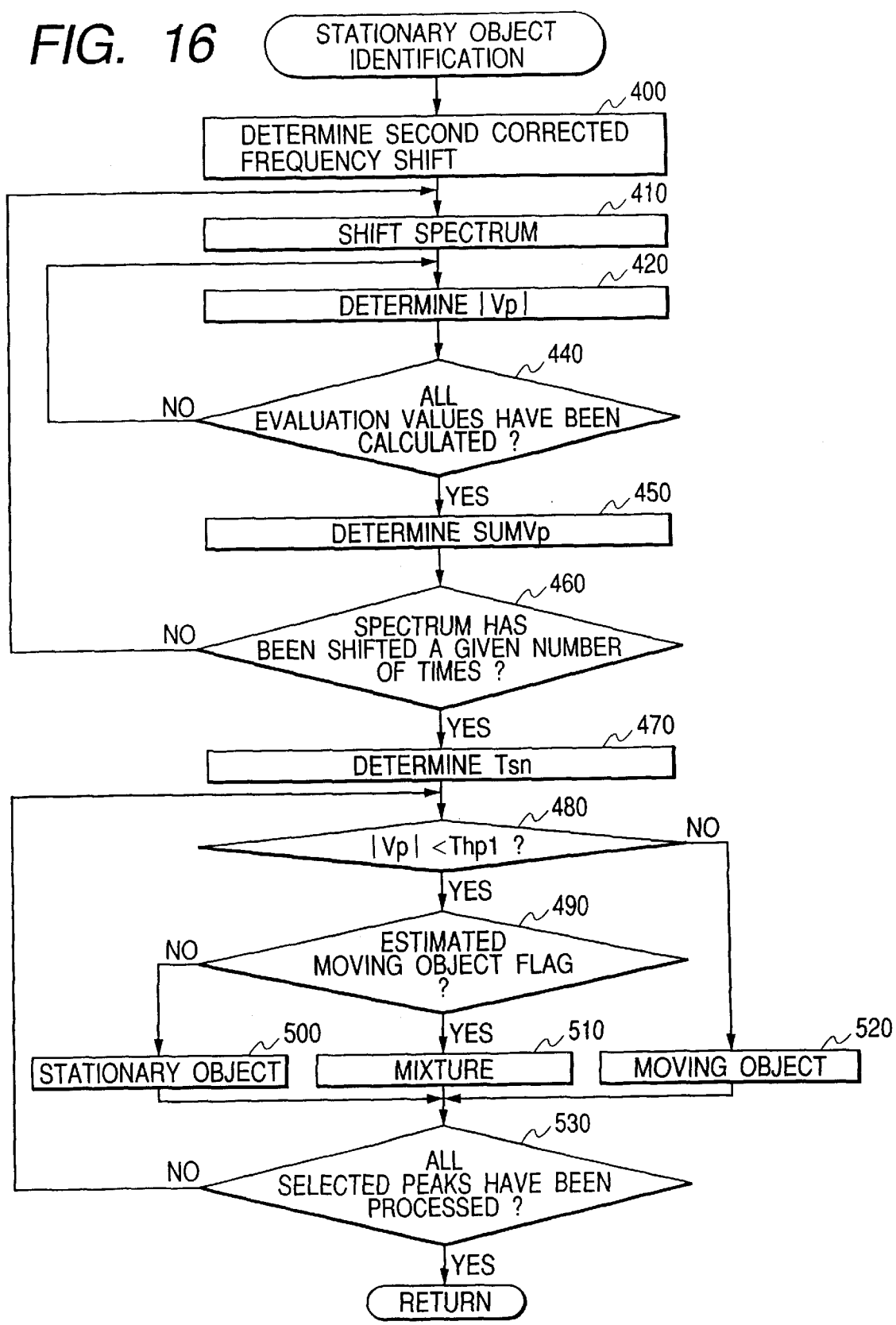

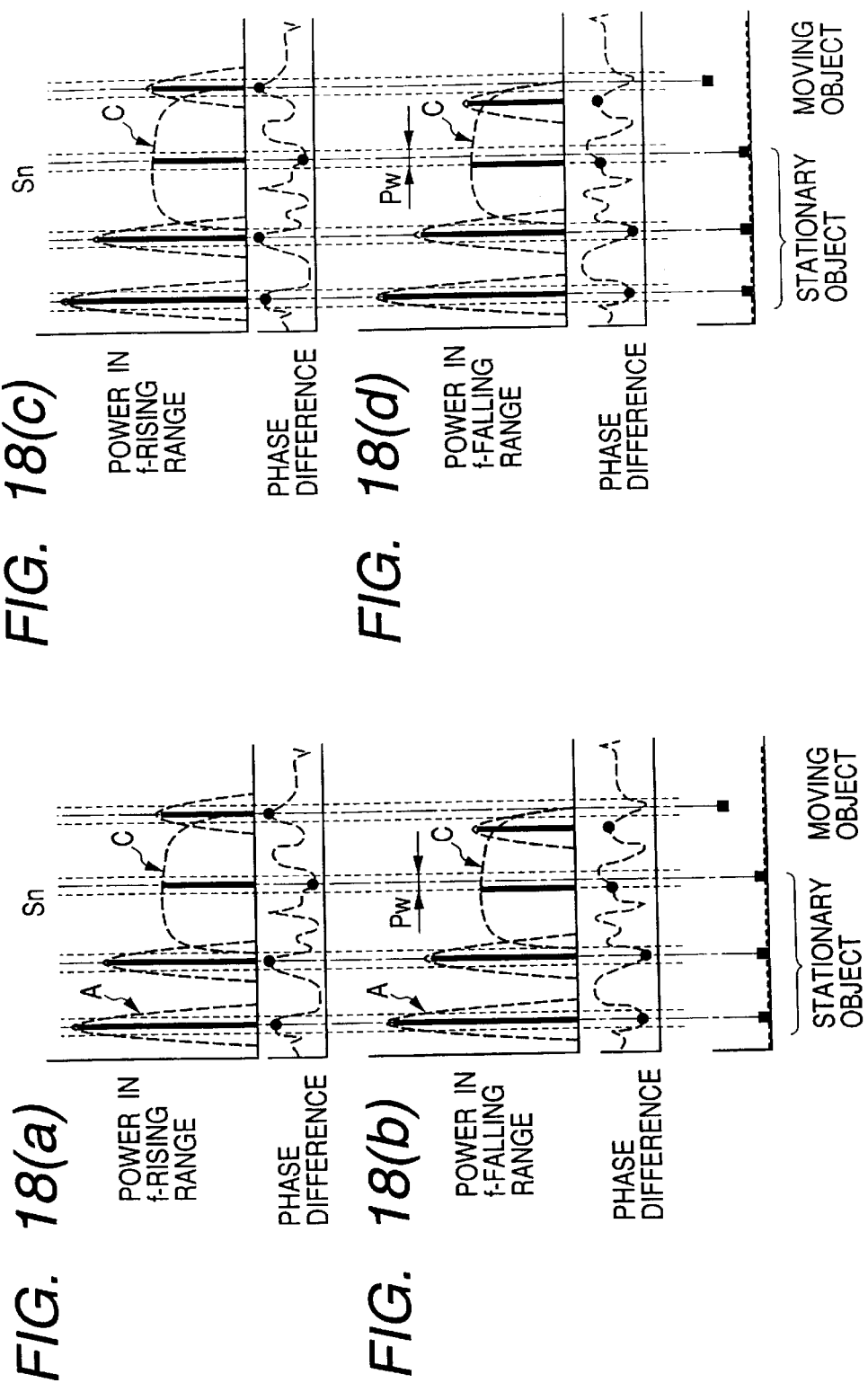

FM-CW RADAR SYSTEM FOR MEASURING DISTANCE TO AND RELATIVE SPEED OF A TARGET

BACKGROUND OF THE INVENTION

1. Technical Field of the Invention

The present invention relates generally to an FM-CW radar apparatus which may be employed in anti-collision systems or cruise control systems installed in moving objects such as automotive vehicles and which is designed to transmit a frequency-modulated radar wave and receive a return of the radar wave from a target object to determine the distance to and relative speed of the target object.

2. Background Art

Recently, radars are used in automotive vehicles to measure the distance to and relative speed of an object present ahead of the vehicle. As one of such radars, an FM-CW (frequency modulated-continuous wave) radar is proposed which is designed to transmit a radar wave which is frequency-modulated with a triangular wave to have a frequency increasing and decreasing cyclically, receive a radar return of the transmitted radar wave from a target, and mix the received radar wave with the transmitted one to produce a beat signal. The frequency of the beat signal (referred to as a beat frequency below) is determined using a signal processor in each of ranges wherein the frequency of the transmitted radar wave increases and decreases. The frequency of the beat signal in the range wherein the frequency of the transmitted radar wave increase will be referred to as a rising beat frequency, and that range will be referred to as a modulated frequency rising range. Similarly, the frequency of the beat signal in the range wherein the frequency of the transmitted radar wave decreases will be referred to as a falling beat frequency, and that range will be referred to as a modulated frequency falling range. If the rising beat frequency is defined as $fb1$, and the falling beat frequency is defined as $fb2$, the distance D to and relative speed V of a target may be expressed by the equations (A) and (B) below.

$$V = (C/(4 \cdot f0)) \cdot (fb2 - fb1) \qquad (A)$$

$$D = (C/(8 \cdot \Delta F \cdot fm)) \cdot (fb1 + fb2) \qquad (B)$$

where $\Delta F$ is a variation in frequency of the transmitted radar wave, $f0$ is the central frequency of the transmitted radar wave, $1/fm$ is the time required for one cycle of frequency modulation (i.e., $fm$ is the frequency of the triangular wave used in modulating the transmitted radar wave), and C is the speed of light.

FIGS. 1(a) and 1(c) show frequency relations between a signal T transmitted from the FM-CW radar and a signal R received by the FM-CW radar.

FIG. 1(a) illustrates for the case where a moving object equipped with the FM-CW radar and a target are identical in speed with each other, that is, where the relative speed V of the moving object to the target is zero. Usually, a return of a radar wave from a target undergoes a delay of time the radar wave takes to travel from the radar to the target and back. Thus, the received signal R is, as shown in the drawing, shifted in phase from the transmitted signal T along a time axis so that the rising beat frequency $fb1$ will be, as shown in FIG. 1(b), equal to the falling beat frequency $fb2$.

FIG. 1(c) illustrates for the case where a moving object equipped with the FM-CW radar and a target are different in speed from each other, that is, where the relative speed V of the moving object to the target is not zero. In this case, the received signal R is further doppler-shifted in frequency depending upon the relative speed V so that the received signal R is shifted in frequency from the transmitted signal T, which will cause, as shown in FIG. 1(d), the rising beat frequency $fb1$ to be different from the falling beat frequency $fb2$.

The use of the above relations between the rising beat frequency $fb1$ and the falling beat frequency $fb2$, thus, allows the distance D to and relative speed V of the target to be calculated.

In recent years, techniques for discriminating between a moving object and a stationary object using the FM-CW radar such as ones taught in Japanese Patent First Publication Nos. 7-98375 and 7-191133 are proposed. Such techniques are based on the physical principle that when a subject vehicle is traveling at a speed VB, a stationary object in front of the vehicle is viewed as approaching at the speed VB. For instance, if the direction in which an object approaches a vehicle equipped with the FM-CW radar is defined as a positive direction, and the speed of the vehicle is defined as $-VB$, the relative speed of a stationary object located ahead of the vehicle may be expressed as VB. The difference between the rising beat frequency $fb1$ and the falling beat frequency $fb2$ may, thus, be expressed by the equation (C) below.

$$(fb2 - fb1) = (4 \cdot VB \cdot f0)/C \qquad (C)$$

Analyzing the rising beat frequency $fb1$ and the falling beat frequency $fb2$ using the known Fourier transform, the frequency spectrum of a beat signal (referred to as a rising beat signal below) embracing the rising beat frequency $fb1$ in the modulated frequency rising range wherein a signal transmitted from the FM-CW radar increases in frequency and the frequency spectrum of a beat signal (referred to as a falling beat signal below) embracing the falling beat frequency $fb2$ in the modulated frequency falling range wherein the transmitted signal decreases in frequency will be ones as shown in FIG. 2(a).

If the speed VB of the vehicle is known, the difference between the falling beat frequency $fb2$ and the rising beat frequency $fb1$ may be found as discussed above. Thus, shifting the falling beat signal by a frequency of $(fb2-fb1)$, it will coincide with the rising beat signal, as shown in FIG. 2(b). The use of this fact allows determination of whether the target is a stationary object or a moving object to be made.

However, the above techniques calculate a shift in spectrum or frequency of the beat signal (i.e., the difference between the rising beat frequency $fb1$ and the falling beat frequency $fb2$) only based on the fact that when the vehicle is traveling at the speed VB, the stationary object located ahead of the vehicle may be viewed as approaching at the speed of $-VB$ and thus encounter the problems (1), (2), (3), and (4), as discussed below, associated with lack of accuracy with which a stationary object is discriminated from a moving object.

(1) The lag in response rate and measurement error of a vehicle speed sensor causes the accuracy with which the frequency shift of the beat signal is calculated to be decreased. Specifically, the frequency shift may be determined from the speed of the vehicle, but when the speed of the vehicle is being calculated by a computer built in the vehicle for another control, the lag in inter-control communication and/or a filtering operation will cause a shift between the calculated speed and an actual speed of the vehicle to be produced. Additionally, the vehicle speed sensor usually produces an inherent error in output. It is, thus, difficult to determine the frequency shift of the beat signal correctly only based on the speed of the vehicle.

(2) The direction of a radar beam is not considered in calculating the frequency shift of the beat signal, which will cause the accuracy with which the frequency shift of the beat signal is calculated to be decreased. Usually, radars which are so designed as to be oriented out of the direction in which a vehicle travels and which use a beam steering/scanning sensor produce a shift between the direction of apparent movement of a stationary object and the direction of a radar beam in which it is possible to determine the relative speed of the object using the Doppler effect. The wider a radar range is, the greater will be such a shift.

(3) The comparison of the spectrum of the falling beat signal after shifted with the spectrum of the rising beat signal is usually made only using amplitude information such as the levels of peaks and shape of the spectra, which may cause an error in determining of whether the spectrum of the falling beat signal coincides with that of the rising beat signal or not. Specifically, if there are rising and falling beat signals which are produced by a moving object and which have the same peak level as that produced by a stationary object, it may cause the moving object to be identified as the stationary object in error.

(4) If the peaks of the spectra of beat signals produced by stationary and moving objects are the same, it may cause the peak of the spectrum of the beat signal arising from the moving object to be eliminated. For instance, when the FM-CW radar is used in an automotive vehicle, the spectra of beat signals produced by a stationary object such as a guard rail and a moving object such as a vehicle traveling ahead may be derived at the same time. In this case, the peaks of both the spectra may be combined together depending upon the distance to the stationary object, the distance to the moving object, and the relative speeds of the vehicle to the stationary and moving objects. Particularly, a stationary object having a higher reflectivity such as an entrance of a tunnel will produce a great peak in the spectrum of a beat signal. The frequency near that peak is also wide, which may hide the peak in the spectrum of a beat signal produced by a moving object so that the two peaks may be observed as a single peak.

SUMMARY OF THE INVENTION

It is therefore a principal object of the present invention to avoid the disadvantages of the prior art.

It is another object of the present invention to provide an FM-CW radar apparatus designed to discriminate between a moving object and a stationary object accurately.

It is a further object of the invention to provide a system which is capable of estimating the speed of a vehicle accurately which is equipped with an FM-CW radar.

According to one aspect of the invention, there is provided an FM-CW radar apparatus for a vehicle which may be employed in anti-collision systems or cruise control systems to determine the distance to, relative speed, and angular direction of a target. The FM-CW radar comprises: (a) a radar wave transmitter transmitting a radar wave having a frequency modulated so as to increase at a given rate and decrease at a given rate cyclically; (b) a radar wave receiver receiving a return of the radar wave from a target object present in a radar detection zone to mix the return of the radar wave with the radar wave transmitted from the radar wave transmitter to produce a beat signal; (c) a spectrum producing circuit producing a first spectrum using a portion of the beat signal in a frequency rising range wherein the frequency of the radar wave transmitted from the radar wave transmitter increases and a second spectrum using a portion of the beat signal in a frequency falling range wherein the frequency of the radar wave decreases; (d) a frequency shift determining circuit determining a plurality of frequency shifts for shifting one of the first and second spectra as a function of an output of a speed sensor measuring a speed of a vehicle equipped with the FM-CW radar, the frequency shift determining circuit correcting the frequency shifts for compensating for an error in the output of the speed sensor; (e) a frequency moving circuit moving frequency components having peaks in one of the first and second spectra by the corrected frequency shifts to form spectrum groups each consisting of the frequency components moved by one of the corrected frequency shifts and frequency components having peaks in the other of the first and second spectra; f) a matching determining circuit determining a measure of matching between a spectrum made up of the moved frequency components and the other of the first and second spectra in each of the spectrum groups to select one of the spectrum groups showing the highest measure of matching; (g) an optimum frequency shift determining circuit determining one of the frequency shifts determined by the frequency shift determining circuit corresponding to the one of the spectrum groups selected by the matching determining circuit as an optimum frequency shift; and (h) a target motion determining circuit determining a state of motion of the target object based on the frequency components in the frequency rising and falling ranges in the one of the spectrum groups corresponding to the optimum frequency shift.

In the preferred mode of the invention, the frequency shifts determined by the frequency shift determining circuit are a basic frequency shift determined as a function of the speed of the vehicle and sub-frequency shifts different from the basic frequency shift by given amount.

The frequency moving circuit pairs each of the moved frequency components in the one of the first and second spectra with a corresponding one of the frequency components in the other of the first and second spectra in each of the spectrum group. The matching determining circuit determines a measure of matching between the frequency components forming each pair in each of the spectrum groups to select the one of the spectrum groups showing the highest measure of matching.

The target motion determining circuit determines whether the target object is a stationary object or not based on each measure of matching between one of the frequency components in the first spectrum and a corresponding one of the frequency components in the second spectrum paired in the one of the spectrum groups corresponding to the optimum frequency shift.

The matching determining circuit may determine the measure of matching between portions of the frequency components paired in each of the spectrum groups within a preselected bandwidth across each of the peaks of the frequency components.

The matching determining circuit may determine the measure of matching between the frequency components based on information on an amplitude of each of the frequency components and an azimuth angle of the target object.

The radar wave receiver has two receiving channels. The information is given by an absolute value of a vector sum of an amplitude evaluation value determined by the amplitude of each of the frequency components and a phase difference evaluation value determined by a phase difference between the frequency components derived through the two receiving channels.

The matching determining circuit may calculate the absolute value of the vector sum of the amplitude evaluation value determined by an amplitude of each of frequency elements defined across the peak of each of the frequency components within a given bandwidth and the phase difference evaluation value determined by a phase difference between corresponding two of the frequency elements of the frequency components derived through the two receiving channels and sums up the absolute values of the vector sums in each of the frequency components to produce a first sum value. The matching determining circuit also sums up the first sum values in each of the spectrum groups to produce a second sum value and selects one of the spectrum groups showing the smallest of the second sum values as the one showing the highest measure of matching.

The target motion determining circuit determines that the target object is a stationary object when a selected one of the first sum values is smaller than a threshold value.

The frequency shift determining circuit may also determine the frequency shifts as a function of an angular direction of the radar wave transmitted from the radar wave transmitter.

The target motion determining circuit determines, in a cycle, whether the target object is a stationary object or a moving object, estimates a position at which the frequency component arising from the target object determined as the moving object would exist in a subsequent cycle, and sets an estimated moving object flag at the position. The target motion determining circuit does not determine, in the subsequent cycle, the target object as the stationary object based on the frequency component appearing at the position at which the estimated moving object flag is set.

The matching determining circuit may determine the measure of matching based on information on peaks of the frequency components.

The information is information on one of frequencies of the peaks, levels of the peaks, and phase differences of the peaks.

According to the second aspect of the invention, there is provided an FM-CW radar for a vehicle which comprises: (a) a radar wave transmitter transmitting a radar wave in the form of a radar beam which has a frequency modulated so as to increase at a given rate and decrease at a given rate cyclically; (b) a radar wave receiver receiving a return of the radar wave from a target object present in a radar detection zone to mix the return of the radar wave with the radar wave transmitted from the radar wave transmitter to produce a beat signal; (c) a spectrum producing circuit producing a first spectrum using a portion of the beat signal in a frequency rising range wherein the frequency of the radar wave transmitted from the radar wave transmitter increases and a second spectrum using a portion of the beat signal in a frequency falling range wherein the frequency of the radar wave decreases; (d) a frequency shift determining circuit determining a frequency shifts for shifting one of the first and second spectra as a function of an output of a speed sensor measuring a speed of a vehicle equipped with the FM-CW radar, the frequency shift determining circuit correcting the frequency shift as a function of an angular direction of the radar beam transmitted from the radar wave transmitter; (e) a frequency moving circuit moving frequency components having peaks in one of the first and second spectra by the corrected frequency shift to pair each of the moved frequency components in the one of the first and second spectra with a corresponding one of the frequency components in the other of the first and second spectra; and (f) a target motion determining circuit determining a state of motion of the target object based on the frequency components paired by the frequency moving circuit.

In the preferred mode of the invention, a matching determining circuit may further be provided which determines a measure of matching between the frequency components forming each pair. The target motion determining circuit determines the state of motion of the target object based on the measures of matching determined by the matching determining circuit.

The matching determining circuit may determine the measure of matching between portions of the paired frequency components within a preselected bandwidth across each of the peaks of the frequency components.

The matching determining circuit may determine the measure of matching between the frequency components based on information on an amplitude of each of the frequency components and an azimuth angle of the target object.

The radar wave receiver has two receiving channels. The information is given by an absolute value of a vector sum of an amplitude evaluation value determined by the amplitude of each of the frequency components and a phase difference evaluation value determined by a phase difference between the frequency components derived through the two receiving channels.

The matching determining circuit may calculate the absolute value of the vector sum of the amplitude evaluation value determined by an amplitude of each of frequency elements defined across the peak of each of the frequency components within a given bandwidth and the phase difference evaluation value determined by a phase difference between corresponding two of the frequency elements of the frequency components derived through the two receiving channels and sum up the absolute values of the vector sums in each of the frequency components to produce a sum value. The target motion determining circuit determines that the target object is the stationary object when a selected one of the sum values is smaller than a threshold value.

The target motion determining circuit determines, in a cycle, whether the target object is a stationary object or a moving object, estimates a position at which the frequency component arising from the target object determined as the moving object would exist in a subsequent cycle, and sets an estimated moving object flag at the position. The target motion determining circuit does not determine, in the subsequent cycle, the target object as the stationary object based on the frequency component appearing at the position at which the estimated moving object flag is set.

The matching determining circuit may determine the measure of matching based on information on peaks of the paired frequency components.

The information is information on one of frequencies of the peaks, levels of the peaks, and phase differences of the peaks.

According to the third aspect of the invention, there is provided an FM-CW radar which comprises: (a) a radar wave transmitter transmitting a radar wave in the form of a radar beam which has a frequency modulated so as to increase at a given rate and decrease at a given rate cyclically; (b) a radar wave receiver receiving a return of the radar wave from a target object present in a radar detection zone to mix the return of the radar wave with the radar wave transmitted from the radar wave transmitter to produce a beat signal; (c) a spectrum producing circuit producing a first spectrum using a portion of the beat signal in a frequency rising range wherein the frequency of the radar wave transmitted from the radar wave transmitter increases and a second spectrum using a portion of the beat signal in a frequency falling range wherein the frequency of the radar wave decreases; (d) a frequency moving circuit moving frequency components having peaks in one of the first and second spectra by a preselected frequency shift to pair each of the moved frequency components in the one of the first and second spectra with a corresponding one of the frequency components in the other of the first and second spectra; (e) a matching determining circuit determining a measure of matching between the frequency components forming each pair based on information on an amplitude of each of the frequency components and an azimuth angle of the target object; and (f) a target motion determining circuit determining a state of motion of the target object based on the measures of matching determined by the matching determining circuit.

In the preferred mode of the invention, the matching determining circuit may determine the measure of matching between portions of the paired frequency components within a preselected bandwidth across each of the peaks of the frequency components.

The radar wave receiver has two receiving channels. The information is given by an absolute value of a vector sum of an amplitude evaluation value determined by the amplitude of each of the frequency components and a phase difference evaluation value determined by a phase difference between the frequency components derived through the two receiving channels.

The matching determining circuit may calculate the absolute value of the vector sum of the amplitude evaluation value determined by an amplitude of each of frequency elements defined across the peak of each of the frequency components within a given bandwidth and the phase difference evaluation value determined by a phase difference between corresponding two of the frequency elements of the frequency components derived through the two receiving channels and sum up the absolute values of the vector sums in each of the frequency components to produce a sum value. The target motion determining circuit determines that the target object is the stationary object when a selected one of the sum values is smaller than a threshold value.

The target motion determining circuit determines, in a cycle, whether the target object is a stationary object or a moving object, estimates a position at which the frequency component arising from the target object determined as the moving object would exist in a subsequent cycle, and sets an estimated moving object flag at the position. The target motion determining circuit does not determine, in the subsequent cycle, the target object as the stationary object based on the frequency component appearing at the position at which the estimated moving object flag is set.

The matching determining circuit may determine the measure of matching based on information on peaks of the paired frequency components.

The information is information on one of frequencies of the peaks, levels of the peaks, and phase differences of the peaks.

According to the fourth aspect of the invention, there is provided an FM-CW radar which comprises: (a) a radar wave transmitter transmitting a radar wave in the form of a radar beam which has a frequency modulated so as to increase at a given rate and decrease at a given rate cyclically; (b) a radar wave receiver receiving a return of the radar wave from a target object present in a radar detection zone to mix the return of the radar wave with the radar wave transmitted from the radar wave transmitter to produce a beat signal; (c) a spectrum producing circuit producing a first spectrum using a portion of the beat signal in a frequency rising range wherein the frequency of the radar wave transmitted from the radar wave transmitter increases and a second spectrum using a portion of the beat signal in a frequency falling range wherein the frequency of the radar wave decreases; (d) a frequency moving circuit moving frequency components having peaks in one of the first and second spectra by a preselected frequency shift to pair each of the moved frequency components in the one of the first and second spectra with a corresponding one of the frequency components in the other of the first and second spectra; and (e) a target motion determining circuit comparing the frequency components forming each pair to determine a state of motion of the target object, the target motion determining circuit determining, in a cycle, whether the target object is a stationary object or a moving object, estimating a position at which the frequency component arising from the target object determined as the moving object would exist in a subsequent cycle, and setting an estimated moving object flag at the position, the target motion determining circuit not determining, in the subsequent cycle, the target object as the stationary object based on the frequency component appearing at the position at which the estimated moving object flag is set.

According to the fifth aspect of the invention, there is provided an FM-CW radar apparatus for a vehicle which comprises: (a) a radar wave transmitter transmitting a radar wave having a frequency modulated so as to increase at a given rate and decrease at a given rate cyclically; (b) a radar wave receiver receiving a return of the radar wave from a target object present in a radar detection zone to mix the return of the radar wave with the radar wave transmitted from the radar wave transmitter to produce a beat signal; (c) a spectrum producing circuit producing a first spectrum using a portion of the beat signal in a frequency rising range wherein the frequency of the radar wave transmitted from the radar wave transmitter increases and a second spectrum using a portion of the beat signal in a frequency falling range wherein the frequency of the radar wave decreases; (d) a frequency shift determining circuit determining a frequency shift for shifting one of the first and second spectra as a function of a speed of a vehicle equipped with the FM-CW radar; (e) a frequency moving circuit moving frequency components having peaks in one of the first and second spectra by the frequency shift to form pairs each consisting of one of the frequency components moved by the frequency shift and a corresponding one of frequency components having peaks in the other of the first and second spectra; (f) a matching determining circuit determining a measure of matching between a spectrum made up of the frequency components moved by the frequency moving circuit and the other of the first and second spectra based on information on portions of the frequency components within a preselected bandwidth across each of the peaks of the frequency components in one of the first and second spectra selected as a reference; and (g) a target motion determining circuit determining a state of motion of the target object based on the pairs of the frequency components.

According to the sixth aspect of the invention, there is provided an FM-CW radar apparatus for a vehicle which comprises: (a) a radar wave transmitter transmitting a radar wave having a frequency modulated so as to increase at a given rate and decrease at a given rate cyclically; (b) a radar wave receiver receiving a return of the radar wave from a target object present in a radar detection zone to mix the return of the radar wave with the radar wave transmitted from the radar wave transmitter to produce a beat signal; (c) a spectrum producing circuit producing a first spectrum using a portion of the beat signal in a frequency rising range wherein the frequency of the radar wave transmitted from the radar wave transmitter increases and a second spectrum using a portion of the beat signal in a frequency falling range wherein the frequency of the radar wave decreases; (d) a frequency shift determining circuit determining a frequency shift for shifting one of the first and second spectra as a function of a speed of a vehicle equipped with the FM-CW radar; (e) a frequency moving circuit moving frequency components having peaks in one of the first and second spectra within a range of the frequency shift±a given frequency band; and (f) a matching determining circuit determining a measure of matching between a spectrum made up of the frequency components moved by the frequency moving circuit and the other of the first and second spectra based on information on the peaks of the frequency components of the first and second spectra.

In the preferred mode of the invention, the information is information on one of frequencies of the peaks, levels of the peaks, and phase differences of the peaks.

The radar wave receiver has two receiving channels. The matching determining circuit determines the measure of matching based on an absolute value of a vector sum of an amplitude evaluation value determined by the amplitude of each of the frequency components and a phase difference evaluation value determined by a phase difference between the frequency components derived through the two receiving channels.

A target motion determining circuit may further be provided which determines that the target object is a stationary object when a selected one of the absolute values is smaller than a threshold value.

According to the seventh aspect of the invention, there is provided a storage medium storing means for performing operations of any one of the FM-CW radar apparatuses as set forth above.

According to the eighth aspect of the invention, there is provided an FM-CW radar apparatus for a vehicle which comprises: (a) a radar wave transmitter transmitting a radar wave in the form of a transmit signal which has a frequency modulated so as to increase at a given rate and decrease at a given rate cyclically; (b) a radar wave receiver receiving a return of the radar wave from a target object present in a radar detection zone to mix the return of the radar wave with the radar wave transmitted from the radar wave transmitter to produce a beat signal; (c) a spectrum producing circuit producing a first spectrum using a portion of the beat signal in a frequency rising range wherein the frequency of the radar wave transmitted from the radar wave transmitter increases and a second spectrum using a portion of the beat signal in a frequency falling range wherein the frequency of the radar wave decreases; (d) a frequency shift determining circuit determining a plurality of frequency shifts for shifting one of the first and second spectra as a function of a speed of a vehicle equipped with the FM-CW radar measured by a speed sensor, the frequency shift determining circuit correcting the frequency shifts for compensating for an error in measurement of the speed sensor; (e) a frequency moving circuit moving frequency components having peaks in one of the first and second spectra by the corrected frequency shifts to form spectrum groups each consisting of the frequency components moved by one of the corrected frequency shifts and frequency components having peaks in the other of the first and second spectra; (f) a matching determining circuit determining a measure of matching between a spectrum made up of the moved frequency components and the other of the first and second spectra in each of the spectrum groups to select one of the spectrum groups showing the highest measure of matching; (g) an optimum frequency shift determining circuit determining one of the frequency shifts determined by the frequency shift determining circuit corresponding to the one of the spectrum groups selected by the matching determining circuit as an optimum frequency shift; and (h) an estimating circuit estimating an actual speed of the vehicle by correcting the speed of the vehicle measured by the speed sensor using the optimum frequency shift.

In the preferred mode of the invention, the estimating circuit estimates the actual speed of the vehicle according to an equation below $$TVB = Tsn \cdot C/(4 \cdot f0)$$

where TVB is the actual speed, Tsn is the optimum frequency shift, C is a speed of light, and f0 is a central frequency of the transmit signal.

The frequency shift determining circuit corrects the frequency shifts based on the actual speed estimated by the estimating circuit.

The estimating circuit estimates the actual speed in a cycle, determines an actual acceleration value based on a difference between the actual speed estimated in this cycle and the actual speed estimated one cycle earlier, and estimates an actual speed of the vehicle in a subsequent cycle. The frequency shift determining circuit corrects the frequency shifts based on the estimated actual speed in the subsequent cycle.

The frequency shifts determined by the frequency shift determining circuit may be a basic frequency shift determined as a function of the speed of the vehicle and sub-frequency shifts different from the basic frequency shift by given amount.

The frequency shift determining circuit may also determine the frequency shifts as a function of an angular direction of the radar wave transmitted from the radar wave transmitter.

The frequency moving circuit pairs each of the moved frequency components in the one of the first and second spectra with a corresponding one of the frequency components in the other of the first and second spectra in each of the spectrum group. The matching determining circuit determines a measure of matching between the frequency components forming each pair in each of the spectrum groups to select the one of the spectrum groups showing the highest measure of matching.

A target motion determining circuit may further be provided which determines whether the target object is a stationary object or not based on each measure of matching between one of the frequency components in the first spectrum and a corresponding one of the frequency components in the second spectrum paired in the one of the spectrum groups corresponding to the optimum frequency shift.

The target motion determining circuit determines, in a cycle, whether the target object is a stationary object or a moving object, estimates a position at which the frequency component arising from the target object determined as the moving object would exist in a subsequent cycle, and sets an estimated moving object flag at the position. The target motion determining circuit does not determine, in the subsequent cycle, the target object as the stationary object based on the frequency component appearing at the position at which the estimated moving object flag is set.

The target motion determining circuit compares the actual speed estimated by the estimating circuit with a relative speed of the target object to the vehicle and reflects a result of the comparison on determination of whether the target object is the stationary object or the moving object.

The matching determining circuit may determine the measure of matching based on information on at least one of an amplitude of each of the frequency components and an azimuth angle of the target object.

The radar wave receiver has two receiving channels. The information is given by an absolute value of a vector sum of an amplitude evaluation value determined by the amplitude of each of the frequency components and a phase difference evaluation value determined by a phase difference between the frequency components derived through the two receiving channels.

The matching determining circuit may calculate the absolute value of the vector sum of the amplitude evaluation value determined by an amplitude of each of frequency elements defined across the peak of each of the frequency components within a given bandwidth and the phase difference evaluation value determined by a phase difference between corresponding two of the frequency elements of the frequency components derived through the two receiving channels and sum up the absolute values of the vector sums in each of the frequency components to produce a first sum value. The matching determining circuit also sums up the first sum values in each of the spectrum groups to produce a second sum value and selects one of the spectrum groups showing the smallest of the second sum values as the one showing the highest measure of matching.

A target motion determining circuit may further be provided which determines that the target object is a stationary object when a selected one of the first sum values is smaller than a threshold value.

According to the ninth aspect of the invention, there is provided a storage medium storing means for performing operations of the FM-CW radar apparatus as set forth above.

According to the tenth aspect of the invention, there is provided a vehicle control apparatus which uses the actual speed of the vehicle estimated in claim 37 in preselected vehicle control operations.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 1(*a*) is a graph which shows frequencies of transmitted and received signals when the relative speed of a target is substantially zero;

FIG. 1(*b*) is a graph which shows a beat frequency when the relative speed of a target is substantially zero;

FIG. 1(*c*) is a graph which shows frequencies of transmitted and received signals when the relative speed of a target is not zero;

FIG. 1(*d*) is a graph which shows a beat frequency when the relative speed of a target is not zero;

FIG. 2(*b*) illustrates spectra of rising and falling beat signals when the falling beat signal is shifted in frequency to the rising beat signal;

FIG. 10(*b*) illustrates a spectrum in a modulated frequency falling range;

FIG. 11(*a*) illustrates powers of frequency components in a modulated frequency rising range;

FIG. 11(*b*) illustrates powers of frequency components in a modulated frequency falling range which is shifted;

FIG. 14(*b*) illustrates frequency peaks in a modulated frequency rising range;

FIG. 15(*a*) illustrates powers of frequency peaks in a modulated frequency rising range;

FIG. 15(*b*) illustrates powers of frequency peaks in a modulated frequency falling range which is shifted;

FIG. 16 is a flowchart of a program for determining the type of a target according to the second embodiment of the invention;

FIG. 17(*b*) illustrates frequency peaks in a modulated frequency falling range when there is a guardrail in a radar detection zone;

FIG. 18(*a*) illustrates powers of frequency peaks in a modulated frequency rising range in the third embodiment;

FIG. 18(*b*) illustrates powers of frequency peaks in a modulated frequency falling range in the third embodiment;

FIG. 18(*c*) illustrates powers of frequency peaks in a modulated frequency rising range in the fourth embodiment;

FIG. 18(*d*) illustrates powers of frequency peaks in a modulated frequency falling range in the fourth embodiment;

DESCRIPTION OF THE PREFERRED EMBODIMENTS

Figure 2A:
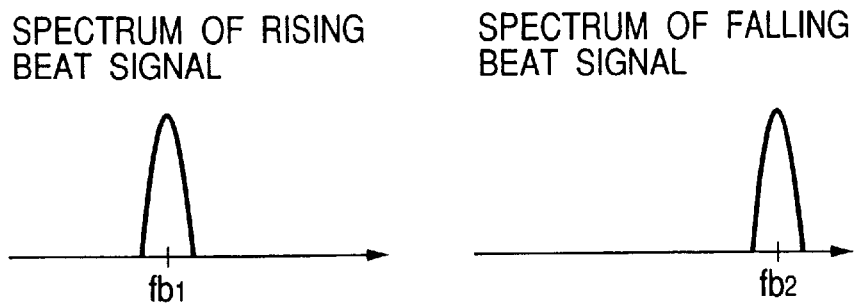
FIG. 2(*a*) illustrates spectra of rising and falling beat signals.
Figure 2B:
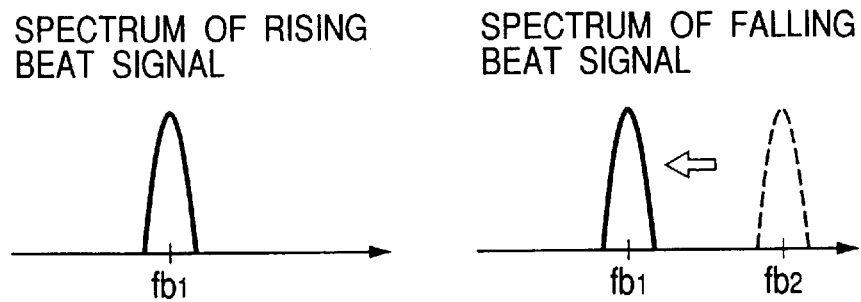
Figure 3:
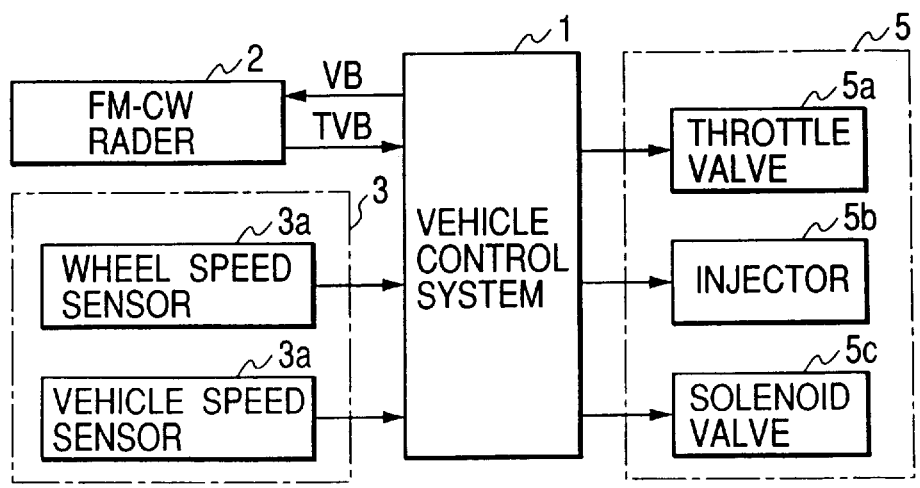
FIG. 3 is a block diagram which shows a vehicle control system equipped with an FM-CW radar according to the present invention.

Referring now to the drawings, wherein like numbers refer to like parts in several views, particularly to FIG. 3, there is shown a vehicle control system 1 which includes a computer for performing anti-collision control, radar cruise control, and/or anti-skid control. The vehicle control system 1 is provided with an FM-CW radar 2 that is known as a phase difference monopulse radar. The vehicle control system 1 receives outputs from sensors 3 including a wheel speed sensor 3a and a vehicle speed sensor 3b and outputs control signals to actuators 5 including a throttle valve 5a, injectors 5b, and solenoid valves 5c for hydraulic control. The vehicle speed sensor 3b is designed to measure the speed of a crankshaft of an engine and provides a sensor signal indicative of the vehicle speed VB to the radar 2 through the vehicle control system 1. The radar 2, as described later in detail in one of embodiments of the invention, corrects the vehicle speed VB and provides the corrected vehicle speed TVB (also referred to as an actual vehicle speed below) to the vehicle control system 1 for use in the above described control.

Figure 4:
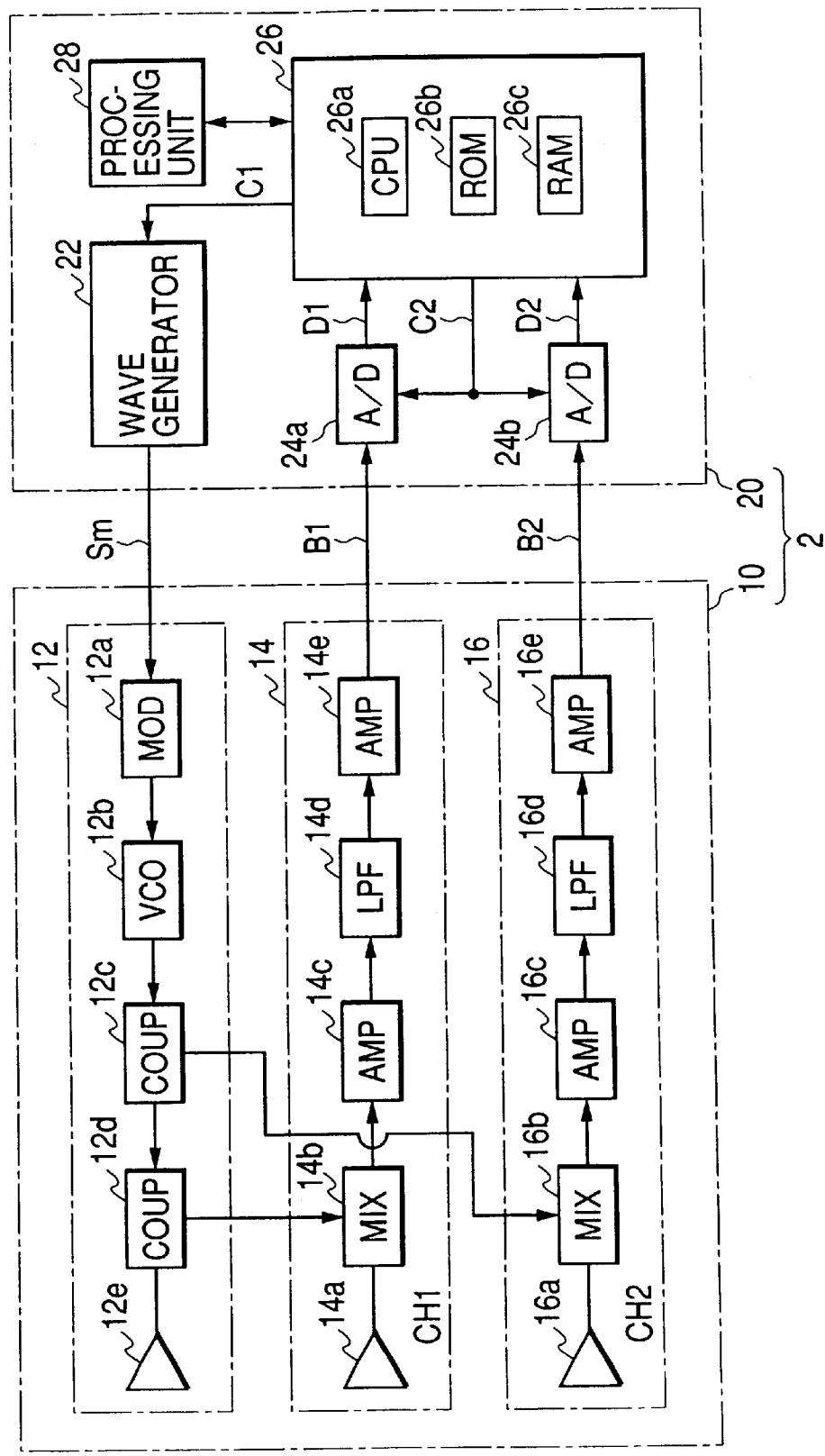
FIG. 4 is a block diagram which shows an FM-CW radar according to the present invention.

The FM-CW radar 2, as shown in FIG. 4, generally consists of a transceiver 10 and a signal processor 20. The transceiver 10 includes a transmitter 12 and a pair of receivers 14 and 16. The transmitter 12 transmits a radar wave whose frequency is modulated with a modulating signal Sm. The receivers 14 and 16 receive a return of the radar wave from a reflective object present in a given detection zone and output beat signals B1 and B2 having intermediate frequencies. The signal processor 20 provides the modulating signal Sm to the transmitter 12 and determines whether the object in the detection zone is a moving object or a stationary object using the beat signals B1 and B2.

In the following discussion, it is assumed that the radar 2 is mounted in an automotive vehicle (referred to as a system vehicle below) to detect an obstacle in front of the system vehicle, the transceiver 10 is installed on the front of the system vehicle, and the signal processor 20 is installed in or near a cabin.

The transmitter 12 includes a modulator 12a, a voltage-controlled oscillator (VCO) 12b, power distributors (i.e., couplers) 12c and 12d, and a transmitting antenna 12e. The modulator 12a adjusts the level of the modulating signal Sm to one for the voltage-controlled oscillator 12b. The voltage-controlled oscillator 12b produces a high-frequency signal in a millimeter wave band. The power distributors 12c and 12d split in power the high-frequency signal to provide local signals to the receivers 14 and 16, respectively. The transmitting antenna 12e radiates an output of the power distributor 12d (i.e., the high-frequency signal) as a radar wave.

The receiver 14 includes a receiving antenna 14a, a mixer 14b, a preamplifier 14c, a low-pass filter 14d, and a post-amplifier 14e. The receiving antenna 14a receives a return of the radar wave transmitted from the transmitting antenna 12e. The mixer 14b mixes the received signal with the local signal inputted from the power distributor 12d and outputs it to the preamplifier 14c. The preamplifier 14c amplifies the output from the mixer 14b. The low-pass filter 14d removes unwanted high-frequency components from an output from the preamplifier 14c to produce the beat signal B1 having a frequency component corresponding to the difference in frequency between the transmitted signal and the received signal. The post-amplifier 14e amplifiers the beat signal B1 to a required level and output it to the signal processor 20.

The receiver 16, as can be seen from the drawing, has the same structure as that of the receiver 14 and mixes a received signal with the local signal inputted from the power distributor 12c to produce the beat signal B2. The receivers 14 and 16 will also be referred to below as a channel CH1 and a channel CH2, respectively.

The signal processor 20 consists of a triangular wave generator 22, A/D converters 24a and 24b, a microcomputer 26, and an arithmetic processing unit 28. The triangular wave generator 22 activates in response to a start signal C1 from the microcomputer 26 to generate the modulating signal Sm in the form of a triangular wave. The A/D converters 24a and 24b operate in response to a start signal C2 to convert the beat signals B1 and B2 inputted from the receivers 14 and 16 into digital signals D1 and D2. The microcomputer 26 consists of a CPU 26a, a ROM 26b, and a RAM 26c and controls the triangular wave generator 22, the A/D converters 24a and 24b, and the arithmetic processing unit 28. The microcomputer 26 also determines the distance to and relative speed and azimuth or angular direction of a target based on the digital signals D1 and D2 and also determines whether the target is a moving object or a stationary object. The arithmetic processing unit 28 is response to a command signal from the microcomputer 26 to perform the fast Fourier transform (FFT).

The A/D converters 24a and 24b are responsive to the start signal C2 to convert the beat signals B1 and B2 into the digital signals D1 and D2 at regular intervals and store them in given memory locations of the RAM 26c. After completion of a given number of A/D conversions, each of the A/D converters 24a and 24b sets a termination flag in the RAM 26c and stops operating.

When the triangular wave generator 22 outputs the modulating signal Sm to the voltage-controlled oscillator 12b through the modulator 12a, the voltage-controlled oscillator 12b produces a radar output signal (also referred to below as a transmit signal) whose frequency increases in a cycle at a given rate in a range (i.e., the modulated frequency rising range) wherein the modulating signal Sm in the form of a triangular wave rises in level linearly and decreases in a cycle at a given rate in a following range (i.e., the modulated frequency falling range) wherein the modulating signal Sm falls in level linearly.

Figure 5:
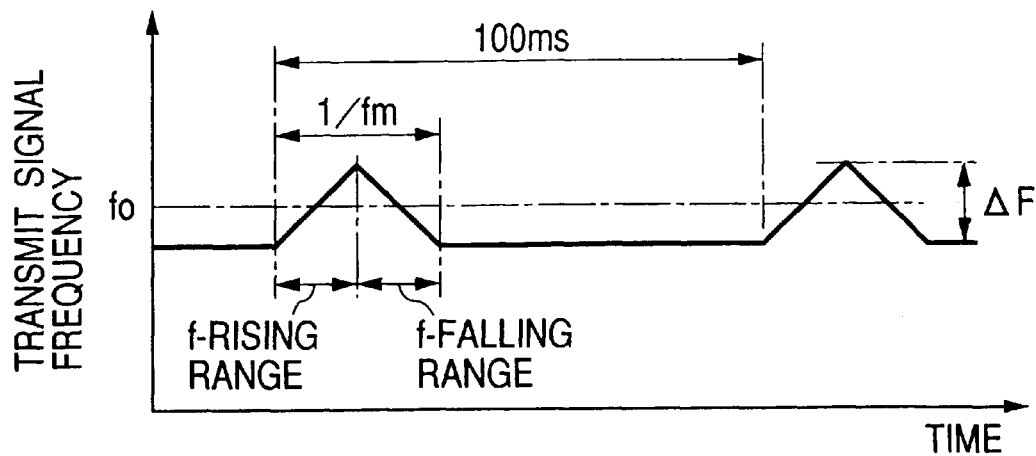
FIG. 5 is a graph which shows a variation in frequency of a radar wave.

FIG. 5 shows a variation in frequency of the radar output signal.

The frequency of the radar output signal is modulated with the modulating signal Sm so that it may increase and decrease by $\Delta F$ in a range of $1/fm$ cyclically The central frequency of the radar output signal in the range of $1/fm$ will be defined as $f0$ below. The cycle in which the radar output signal is modulated is set to 100 ms. This is because an obstacle detection program, as will be discussed later, is executed at regular intervals of 100 ms, and the start signal C1 is outputted in each program cycle.

The transmitter 12 radiates a radar wave produced by the radar output signal modulated with the modulating signal Sm. If a reflective object is present in the detection zone, the receivers 14 and 16 receive returns of the radar wave from the object through the receiving antennas 14a and 14b and mix them with the radar output signals inputted from the transmitter 12 to produce the beat signals B1 and B2, respectively. The returns of the radar wave, or signals received by the receivers 14 and 16 each undergo a delay of time the radar wave takes to travel from the transmitter 12 to the object and back and are also doppler-shifted in frequency if the object is moving relative to the radar 2. The beat signals B1 and B2, thus, contain, as shown in FIG. 1(c), a time-delayed component fr and a doppler-shifted component fd.

Figure 6:
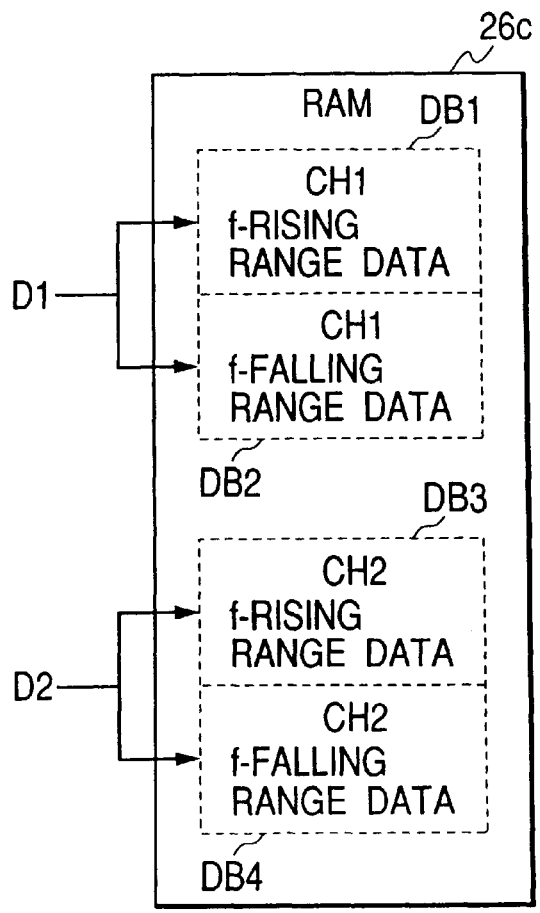
FIG. 6 is an illustration which shows storage locations of a RAM in a radar wherein frequency components derived by beat signals are stored.

The A/D converters 24a and 24b convert the beat signals B1 and B2 into the digital signals D1 and D2. The digital signal D1 is, as shown in FIG. 6, stored in either of memory locations or data blocks DB1 and DB2 of the RAM 26c. Similarly, the digital signal D2 is stored in either of data blocks DB3 and DB4. Specifically, each of the A/D converters 24a and 24b operates upon activation of the triangular wave generator 22 and performs a given number of A-D conversions during output of the modulating signal Sm. Therefore, the first half of the digital signals D1 and D2 in the modulated frequency rising range are stored in the data blocks DB1 and DB3, respectively, while the second half of the digital signals D1 and D2 in the modulated frequency rising range are stored in the data blocks DB1 and DB3, respectively. The digital signals D1 and D2 thus stored in the RAM 26c are processed in the arithmetic processing unit 28 of the microcomputer 26 to identify obstacles in the detection zone.

Figure 7:
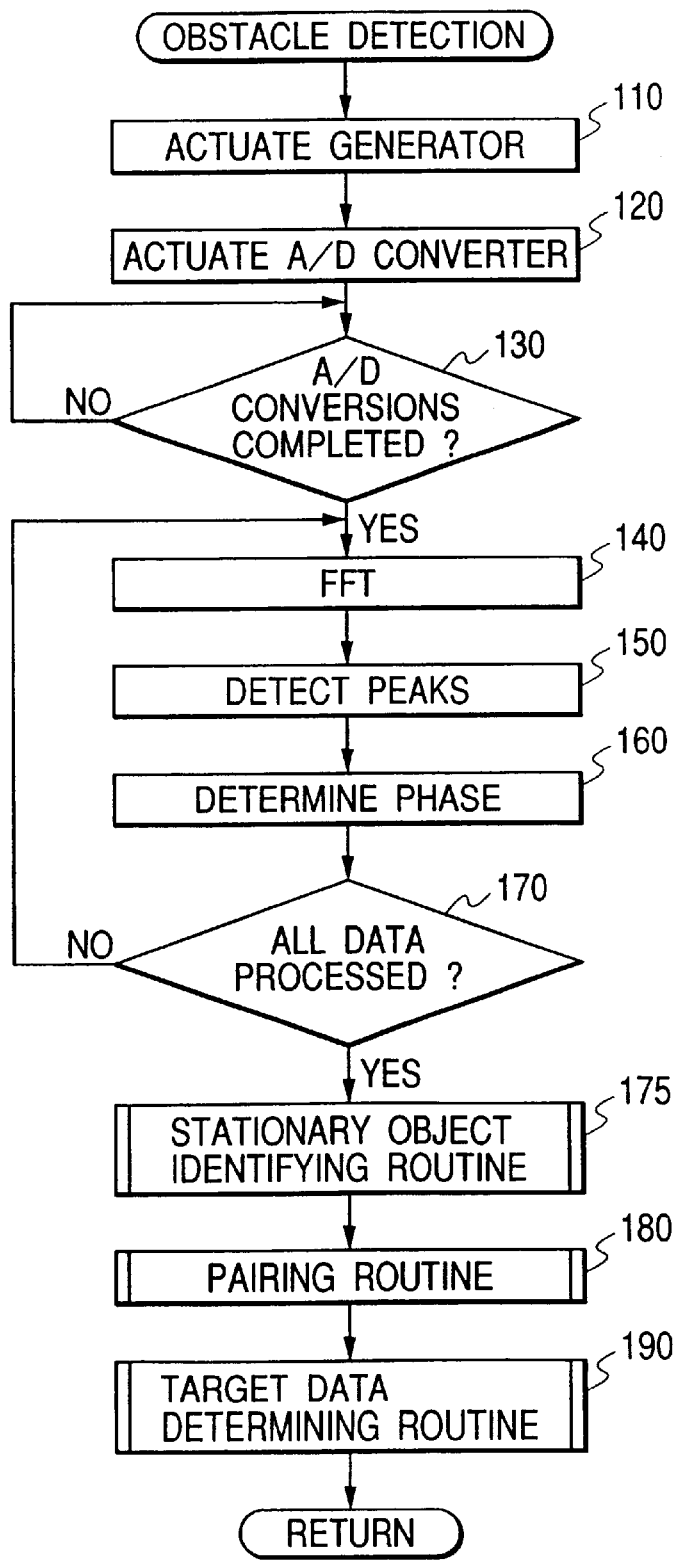
FIG. 7 is a flowchart of a program for determining the distance to, relative speed, and angular direction of a radar-detected object.

FIG. 7 shows a program or logical steps performed by the microcomputer 26 at regular intervals of 100 ms to detect obstacles in the detection zone.

After entering the program, the routine proceeds to step 110 wherein the start signal C1 is outputted to activate the triangular wave generator 22. The routine proceeds to step 120 wherein the termination flag in the RAM 26c is cleared, and the start signal C2 is outputted to activate the A/D converters 24a and 24b.

The transmitter 12 receives the modulating signal Sm from the triangular wave generator 22 and outputs a frequency-modulated radar wave. The receivers 14 and 16 receive returns of the radar wave to produce the beat signals B1 and B2. The A/D converters 24a and 24b convert the beat signals B1 and B2 into the digital signals D1 and D2 and store them in the RAM 26c.

The routine proceeds to step 130 wherein the termination flag in the RAM 26c is checked to determine whether the A-D conversions have been completed or not. If the termination flag is not set, it is determined that the A-D conversions have not yet been completed, and the routine repeats step 130. Alternatively, if the termination flag is set meaning that the A-D conversions have been completed, then the routine proceeds to step 140 wherein the data blocks DB1 to DB4 of the RAM 26c are selected in sequence, and data in each data block DBi (I=1 to 4) is inputted to the arithmetic processing unit 28 to perform FFT (fast Fourier transform) thereon to produce a complex vector for each frequency. The data inputted to the arithmetic processing unit 28 is subjected to the known window processing using a Hanning window or a triangular windows for restricting side lobes appearing in the operation of FFT.

The routine proceeds to step 150 wherein based on absolute values of the complex vectors, that is, amplitudes of frequency components indicated by the complex vectors, all frequency components (also referred to as peak frequency components below) showing peaks (also referred to as spectrum peaks below) of the frequency spectrum are found. The determination of each peak frequency component may be achieved by monitoring a variation in amplitude of each frequency component in time sequence to determine a frequency at which the variation in amplitude is reversed in sign.

The routine proceeds to step 160 wherein the phase of each of the peak frequency components is determined which is equivalent to the angle which each of the complex vectors makes with the real axis.

The routine proceeds to step 170 wherein it is determined whether all data stored in the data blocks DB1 to DB4 of the RAM 26c have been processed or not. If a NO answer is obtained, then the routine repeats the operations in steps 140 to 160 on the data in one of the data blocks DB1 to DB4 which has not yet been processed. Alternatively, if a YES answer is obtained meaning that the data in all the data blocks DB1 to DB4 have been processed, then the routine proceeds to step 175.

In step 175, a stationary object-identifying program, as will be discussed later in detail, is executed.

The routine proceeds to step 180 wherein a pairing program is executed to compare the amplitudes or powers of the peak frequency components to specify a pair of the peak frequency components having the same power in the modulated frequency rising and falling ranges as being derived from a radar wave reflected from the same obstacle. Note that the peak frequency components which have been determined in step 175 not to be a pair having the same power clearly are not subjected to the pairing operation in step 180. U.S. patent application Ser. No. 08/764,627, filed on Dec. 11, 1996 and U.S. Pat. No. 5,731,778, both assigned to the same assignee as that of this application teach such a pairing operation, disclosure of which is incorporated herein by reference.

The routine proceeds to step 190 wherein a distance/speed/azimuth determining program is executed to determine the distance to, the speed and azimuth or angular direction of a target based on the peak frequency components paired in step 180. For example, the phase difference between two of the frequency components derived through the channels CH1 and CH2 in each of the modulated frequency rising and falling ranges is calculated. If the phase differences in the modulated frequency rising and falling ranges are different in sign, the distance D to and the relative speed V of the target are determined according to equations (1) and (2) below.

$$V = (C/(4 \cdot f0)) \cdot (fb2 - fb1) \quad (1)$$

$$D = (C/(8 \cdot \Delta F \cdot fm)) \cdot (fb2 + fb1) \quad (2)$$

where $\Delta F$ is a variation in frequency of the transmit signal, f0 is the central frequency of the transmit signal, 1/fm is the time required for frequency modulation in one cycle (i.e., fm is the frequency of the triangular wave used in modulating the transmit signal), C is the speed of light, fb1 is the rising beat frequency, and fb2 is the falling beat frequency.

The distance/speed/azimuth determining operation in step 190 is taught in the above described U.S. patent application Ser. No. 08/764,627 and U.S. Pat. No. 5,731,778, and explanation thereof in detail will be omitted here.

The stationary object identifying operation in step 175 will be discussed below in detail.

First, a plurality of frequency shifts (Sn−1, Sn, Sn+1) are determined for compensating for an error in output of the vehicle speed sensor 3b or the like. One of the frequency shifts that is an optimum frequency shift Tsn is selected using given evaluation functions. Using a spectrum in the modulated frequency rising range and a spectrum in the modulated frequency falling range moved by the optimum frequency shift Tsn, it is determined whether the target producing the peak frequency components is a stationary object or a moving object. These operations will be described below in more detail.

The frequency shifts Sn−1, Sn, Sn+1 are determined in the following steps (1), (2), and (3).

(1) An equation for calculating a basic frequency shift using the speed VB of the vehicle equipped with the radar 2 is established. Specifically, the equation (3) below is established by modifying the above equation (1) for finding the basic frequency shift (=fb2−fb1) required to determine the degree to which the spectrum of the beat signal should be shifted for identifying a stationary object.

$$(fb2-fb1)=(4-VB\cdot f0)/C \quad (3)$$

where fb1 is the rising beat frequency, fb2 is the falling beat frequency, VB is the vehicle speed, f0 is the central frequency of the transmit signal, and C is the speed of light.

If an error in output of the vehicle speed sensor 3b is already known or learned, the vehicle speed VB which is corrected to compensate for the error by a correction coefficient derived by look-up using a map is used in the equation (3).

Figure 8:
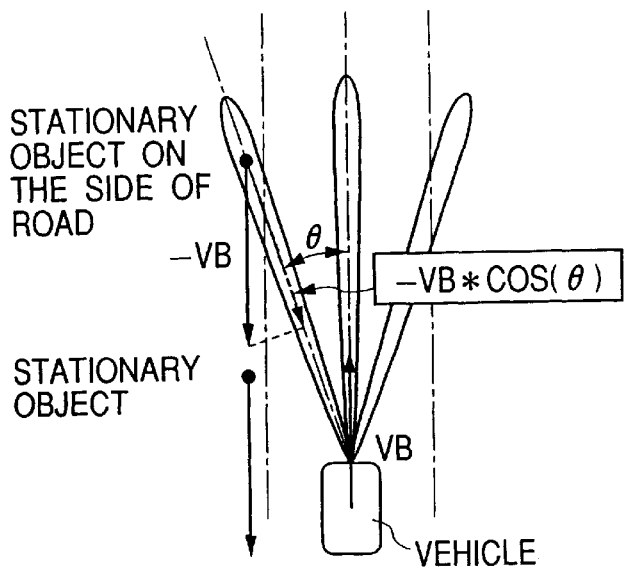
FIG. 8 is an illustration which shows the relation of an angular direction of a radar beam and a relative speed of a stationary object.

(2) The basic frequency shift is corrected as a function of the angular direction in which a radar beam (e.g., a laser beam) is outputted from the transmitter 12. Assume that the angle which the radar beam, as shown in FIG. 8, makes with the front of a beam steering/scanning sensor or a longitudinal center line of the vehicle is defined as a beam angle θ. In a case where the relative speed of a target is determined using the Doppler effect, a detectable speed component is one of speed components in the direction of the radar beam (i.e., −VB·cos θ). This speed component decreases as the beam angle θ increases so that the difference between it and an actual relative speed or speed at which the target is approaching the vehicle (i.e., −VB) becomes great, thereby leading to an error in shifting the frequency of the beat signal.

Therefore, the basic frequency shift is corrected using an angular correction coefficient (cos θ) to determine a first corrected basic frequency shift according to the equation (4) below.

$$\text{First Corrected Basic Frequency Shift}=(4\cdot\cos\theta\cdot VB\cdot f0)/C \quad (4)$$

(3) The first corrected basic frequency shift is further corrected for compensating for a delay in response rate of the vehicle speed sensor 3b. Typically, vehicle speed sensors are designed to measure time intervals between pulse signals outputted from a pulse generator installed on a wheel or a drive line of the vehicle to determine the speed of the vehicle. In practice, an output signal of the vehicle speed sensor 3b is filtered in time sequence to remove noise, thereby resulting in a time lag between output of the pulse signals from the pulse generator and output of the vehicle speed sensor 3b. For example, when the vehicle is running at 100 km/h, the time lag would not be objectionable, but when the vehicle is accelerating or decelerating, it will cause an error of several km/h to be produced.

In practice, the time lag depends upon the type of vehicle. It is, thus, possible to determine a basic time lag in advance. The basic time lag depends upon an actual vehicle speed and a time constant of a filter installed in the vehicle speed sensor 3b and is defined here as speed delay Dv. The first corrected basic frequency shift is corrected according to the equation (5) below to determine a second corrected basic frequency shift.

$$\text{Second Corrected Basic Frequency Shift}=(4\cdot\cos\theta\cdot(VB\pm Dv)\cdot f0)/C \quad (5)$$

The speed delay Dv is set to a value as a function of the resolution of the vehicle speed sensor 3b. For example, if the vehicle speed sensor 3b produces an error within a range of ±5 km/h, the speed delay Dv is set to −5, 0, and +5 to determine, as will be described later in detail, three second corrected basic frequency shifts. Of these basic frequency shifts, one is selected, as described below in detail, which best matches an actual vehicle speed, thereby allowing the peak frequency components in the modulated frequency falling range to be shifted by an amount which compensates for the error in output of the vehicle speed sensor 3b.

In order to facilitate the correction of the basic frequency shift, the speed delay Dv may be set to the value which also compensates for the error caused by the angular direction of the radar beam as already discussed in (2).

Next, the selection of one of the second corrected basic frequency shifts determined in the equation (5) will be described below in detail.

The spectrum in the modulated frequency falling range is moved by the second corrected basic frequency shifts and then compared with the spectrum in the modulated frequency rising range to determine a measure of agreement therebetween in the following steps (1) and (2).

(1) An amplitude evaluation value Y and a phase difference evaluation value X are determined according to evaluation functions (6) and (7) below using the amplitudes of spectrum peaks and the phase differences indicating the azimuth angle of a target which may usually be derived by a phase difference monopulse radar. The phase difference is a difference between phases of radar output signals received through two channels (i.e., the channels CH1 and CH2 in the radar 2). The phase difference monopulse radar is a radar designed to determine an azimuth angle of a target using such a phase difference.

$Y=|$(an amplitude of a peak frequency component in the modulated frequency rising range−an amplitude of a peak frequency component in the modulated frequency falling range)/the amplitude of the peak frequency component in the modulated frequency rising range$|$ (6)

$X=|$a phase difference in the modulated frequency rising range+a phase difference in the modulated frequency falling range$|$ (7)

In the case of a phase difference monopulse radar, the signs of received signals in the modulated frequency rising and falling ranges are different from each other. Thus, if the sum of the received signals is zero, they may be determined as matching each other.

Figure 9:
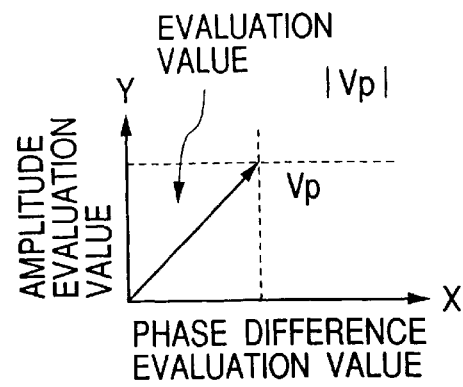
FIG. 9 is an illustration which shows definition of an evaluation value |Vp|.

The length of the vector sum Vp of the amplitude evaluation value Y and the phase difference evaluation value X is, as shown in FIG. 9, defined as an evaluation value $|Vp|$. The evaluation value $|Vp|$ may alternatively be defined only by the amplitude evaluation value Y.

The evaluation values $|Vp|$ are determined using selected some of peak frequency components. In practice, the evaluation values $|Vp|$ are calculated based on each of the selected peak frequency components and neighboring frequency components to determine the sum SUM2 thereof according to the equation (8) below. The frequency range across each of the selected peak frequency components in which the evaluation values |Vp| are calculated is, as shown in FIGS. 11(a) and 11(b), a frequency band between right and left broken lines across a chain line and depends upon the resolution of FFT.

$$\text{SUM2} = |Vp(p-n)| + |Vp(p-n+1)| + \ldots + |Vp(p)| + \ldots + |Vp(p+n)| \quad (8)$$

where p is a number indicating each of the selected peak frequency components from which the evaluation value |Vp| is to be calculated and will be referred to as a peak frequency number below, and n indicates the number of frequency components near the peak frequency component within one of the frequency bands shown in FIGS. 11(a) and 11(b).

The sum SUM2 is, as described above, not determined based on each of all peak frequency components, but only based on each of selected some of the peak frequency components used in determining whether a target is a stationary object or a moving object, thereby minimizing errors caused by noise or clutter and the amount of time required to calculate the sum SUM2.

Figure 10A:
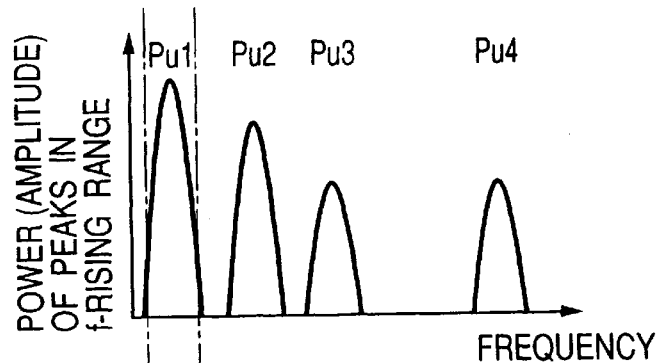
FIG. 10(*a*) illustrates a spectrum in a modulated frequency rising range.
Figure 10B:
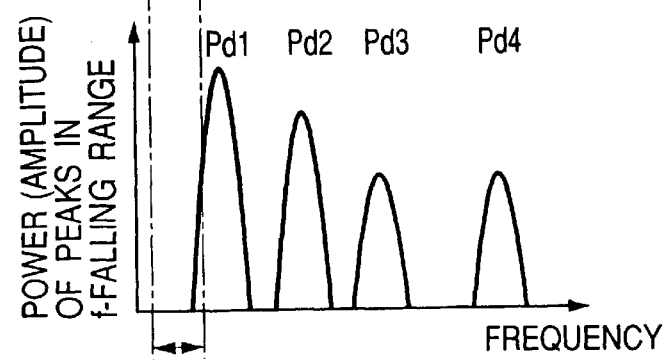

Here, consider an example shown in FIGS. 10(a) and 10(b). Pu1, Pu2, Pu3, and Pu4 indicate spectrum peaks in the modulated frequency rising range, while Pd1, Pd2, Pd3, and Pd4 indicate spectrum peaks in the modulated frequency falling range. Assume that the spectrum peaks Pu1 to Pu3 and Pd1 to Pd3 arise from a stationary object, while the spectrum peaks Pu4 and Pd4 arise from a moving object. If the spectrum peaks Pd1 to Pd4 in the modulated frequency falling range are shifted by the basic frequency shift Sn and sub-frequency shifts Sn±1, they will be broken down into three spectrum groups, as shown in FIG. 11(b). Note that ±1 represents a frequency band for compensating for the delay in response rate and error in output of the vehicle speed sensor 3b and is used here for the sake of convenience. The sum SUM2 is determined using each of pairs of the spectrum peaks in the modulated frequency falling range and corresponding spectrum peaks in the modulated frequency rising range in each of the three spectrum groups.

(2) Next, the sums SUM2 in each of the three spectrum groups are summed up to determine the sum SUM1 according to the equation (9) below.

$$\text{SUM1} = \Sigma \text{SUM2} \quad (9)$$

One of the sums SUM1 which has the smallest value is selected to determine a corresponding one of the frequency shifts Sn and Sn±1. In the case shown in FIGS. 11(a) and 11(b), the middle spectrum group shows the smallest sum SUM1. The frequency shift Sn is, thus, selected as the optimum frequency shift TSn.

The reason that the frequency shift corresponding to the smallest of the sums SUM1 is selected as the optimum frequency shift TSn is because the evaluation value |Vp| becomes small as the sum SUM1 decreases, meaning that a measure of matching between each of spectrum peaks in the modulated frequency rising range and a corresponding one of spectrum peaks in the modulated frequency falling range is high.

In the above example, the three frequency shifts Sn-1, Sn, and Sn+1 are used for the sake of convenience, but in practice the second corrected basic frequency shifts derived by the above equation (5) are used in determining the optimum frequency shift TSn.

Once the optimum frequency shift TSn is determined in step 175, it may be used in determining a new one in a subsequent program cycle.

The determination of whether the target is a moving object or a stationary object will be discussed below in detail.

The type of a target is basically determined using a measure of matching between each of spectrum peaks in the modulated frequency rising range and a corresponding one of spectrum peaks in the modulated frequency falling range shifted by the optimum frequency shift TSn, but this embodiment further considers the possibility that spectrum peaks arising from a moving object and a stationary object may coincide with each other, that is, that they may be combined into one.

Specifically, if the sum SUM2 determined using one of pairs of spectrum peaks in the modulated frequency rising and falling ranges is less than a threshold value Thp, it is basically determined that the spectrum peaks making up the one of pairs are identical in amplitude and azimuth angle of a radar beam (i.e., the phase difference) and that an object creating that pair of spectrum peaks is a stationary object, but if it is determined in a manner, as described later in detail, that spectrum peaks arising from a moving object and a stationary object are combined into one, the determination of the type of a target is not made.

The threshold value Thp may be changed as a function of running conditions of the vehicle and/or weather or fixed to a constant value.

The determination of whether at least one of spectrum peaks in the modulated frequency rising and falling ranges is a mixture of spectrum peaks arising from a moving object and a stationary object or not will be described below in detail.

This determination is made using an estimated moving object flag as discussed below.

Figure 12A:
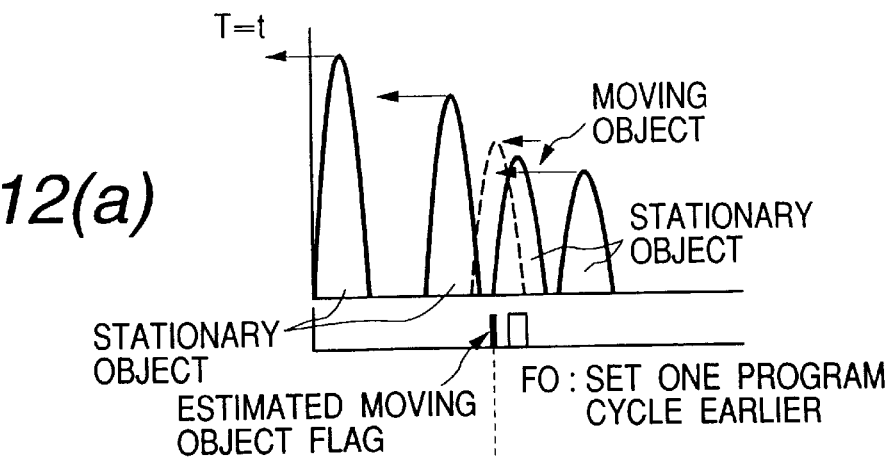
FIG. 12(*a*) is an illustration which shows a location of a frequency component arising from a moving object at time t, FIG. 12(*b*) is an illustration which shows an estimated location of the frequency component arising from the moving object, as shown in FIG. 12(*a*), after time t+Δt.
Figure 12B:
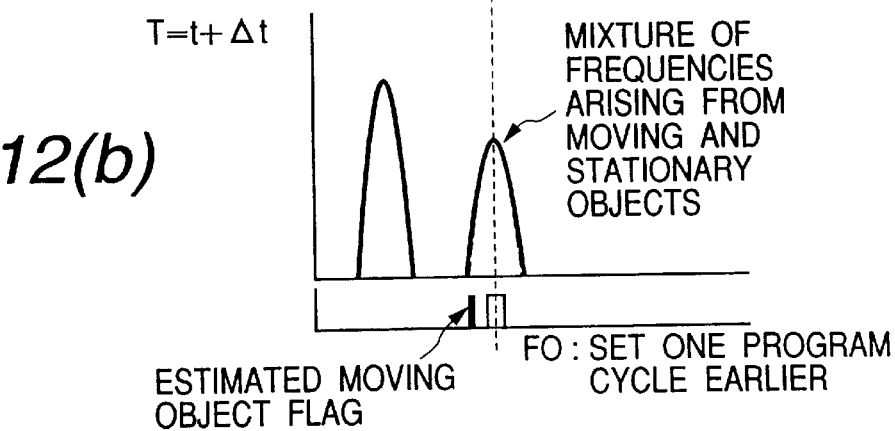

If a selected one of spectrum peaks is determined as arising from any object other than stationary objects, the motion of that object is monitored to estimate the position at which the spectrum peak arising from the object would exist after a predetermined time Δt (i.e., the program execution cycle). Next, the estimated moving object flag is, as shown in FIGS. 12(a) and 12(b), set at the estimated position.

Figure 13:
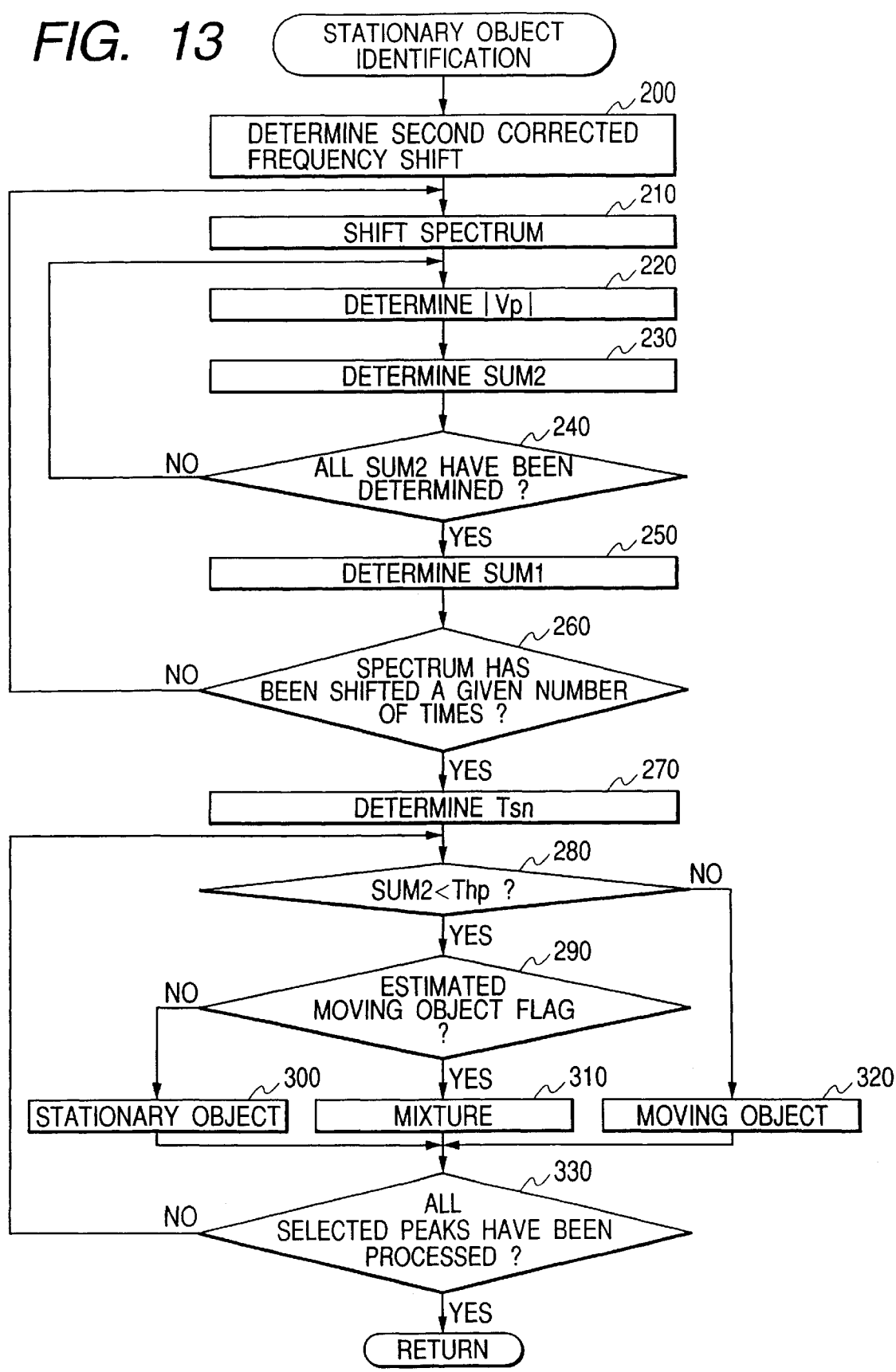
FIG. 13 is a flowchart of a program for determining the type of a target.

The above stationary object-identifying operation executed in step 175 will be explained in more detail with reference to FIG. 13.

After entering the program, the routine proceeds to step 200 wherein the second corrected basic frequency shifts are determined sing the equation (5) in the manner as described above.

The routine proceeds to step 210 wherein if the second corrected basic frequency shifts determined in step 200 are three frequency shifts Sn-1, Sn, and Sn+1, the whole of the spectrum in the modulated frequency falling range is moved in the first program cycle by the frequency shift Sn-1. Similarly, it is moved in the second and third program cycles by the frequency shifts Sn and Sn+1, respectively.

The routine proceeds to step 220 wherein the evaluation values |Vp| are determined in sequence according to the equations (6) and (7) using peak frequency components and neighboring frequency components in the modulated frequency falling range shifted in step 210 and peak frequency components and neighboring frequency component in the modulated frequency rising range.

The routine proceeds to step 230 wherein the evaluation values |Vp| are summed up to determine the sums SUM2 according to the equation (8).

The routine proceeds to step 240 wherein it is determined whether as many sums SUM2 as pairs of the peak frequency components in the modulated frequency rising and falling ranges that are to be used in determining the evaluation values |Vp| have been calculated or not. For example, if there are four pairs of peak frequency components in the left spectrum group, as shown in FIGS. 11(a) and 11(b), it is determined whether the sums SUM2 have been calculated based on all the four pairs or not. If a NO answer is obtained, then the routine returns back to step 220. Alternatively, if a YES answer is obtained, then the routine proceeds to step 250 wherein the sums SUM2 derived in step 230 are summed up to determine the sum SUM1.

The routine proceeds to step 260 wherein it is determined whether the whole of the spectrum in the modulated frequency falling range has been shifted a given number of times or not. For example, if the second corrected basic frequency shifts determined in step 200 are three frequency shifts Sn−1, Sn, and Sn+1, as shown in the example of FIGS. 11(a) and 11(b), it is determined whether the spectrum in the modulated frequency falling range has been moved by the frequency shifts Sn−1, Sn, and Sn+1 to form three spectrum groups or not. If a NO answer is obtained, then the routine returns back to step 210. Alternatively, if a YES answer is obtained, then the routine proceeds to step 270 wherein all the sums SUM1 determined in step 250 are compared to determine one of the second corrected basic frequency shifts determined in step 200 which corresponds to the smallest of the sums SUM1 as the optimum frequency shift TSn.

The routine proceeds to step 280 wherein it is determined whether one of the sums SUM2 determined based on the pairs of peak frequency components in the spectrum group to which the peak frequency components in the modulated frequency falling range moved by the optimum frequency shift TSn belong is smaller than the threshold value Thp or not. If a YES answer is obtained, then the routine proceeds to step 290. Alternatively, if a NO answer is obtained, then the routine proceeds to step 320.

In step 320, it is determined that a measure of agreement between corresponding peak frequency components in the modulated frequency rising and falling ranges is low and that a target creating these peak frequency components is a moving object. A moving object flag indicating that the target is a moving object is, thus, set. The routine then proceeds to step 330.

In step 290, it is determined whether the estimated moving object flag is set or not at a location where the corresponding peak frequency components in the modulated frequency rising and falling ranges exist. If a NO answer is obtained, then the routine proceeds to step 300 wherein it is determined that the target is a stationary object, and a stationary object flag is set. Alternatively, if a YES answer is obtained, then the routine proceeds to step 310 wherein at lest one of the peak frequency components corresponding to the sum SUM2 used in the determination in step 280 is a mixture of peak frequency components arising from both moving and stationary objects, and a mixed peak flag is set.

After step 300, 310, or 320, the routine proceeds to step 330 wherein it is determined whether the operations in steps 280 to 320 have been completed using all of the sums SUM2 or not. If a NO answer is obtained, then the routine returns back to step 280 wherein it is determined whether another one of the sums SUM2 is smaller than the threshold value Thp or not. Alternatively, if a YES answer is obtained in step 330, then the routine terminates.

The second embodiment will be described below.

In the first embodiment, the spectrum peaks in the modulated frequency falling range are shifted and compared in wave form with those in the modulated frequency rising range to recognize the type of a target. Storing the wave form of the spectrum peaks in the radar 2 requires use of a large capacity memory. In a case where the frequency analysis is performed in a processor separate from that used in recognizing the type of a target, it may be difficult to transmit all waveform data to the processor used in recognizing the type of the target because of limitations of transmission rates. In order to avoid this problem, the second embodiment determines the type of a target only using spectrum peak data on frequencies and amplitudes of peaks of frequency components in the modulated frequency rising and falling ranges and phase differences between the corresponding frequency components. Specifically, the first embodiment is designed to shift the peak frequency components in the modulated frequency falling range to determine a measure of matching between waveforms of each of the shifted frequency components and a corresponding one of frequency components in the modulated frequency rising range, but the second embodiment determines a measure of matching between spectrum peak data, as shown by solid lines in FIGS. 14(a) and 14(b), in the modulated frequency rising and falling ranges in the following steps.

(1) First, the length of the vector sum Vp of the amplitude evaluation value Y and the phase difference evaluation value X is, like the first embodiment, determined as the evaluation value |Vp|.

Figure 14A:
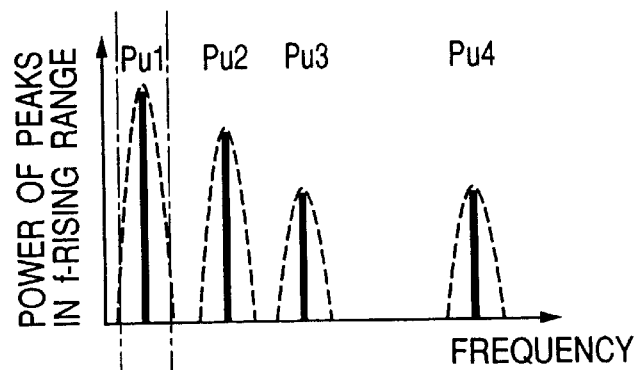
FIG. 14(*a*) illustrates frequency peaks in a modulated frequency falling range.
Figure 14B:
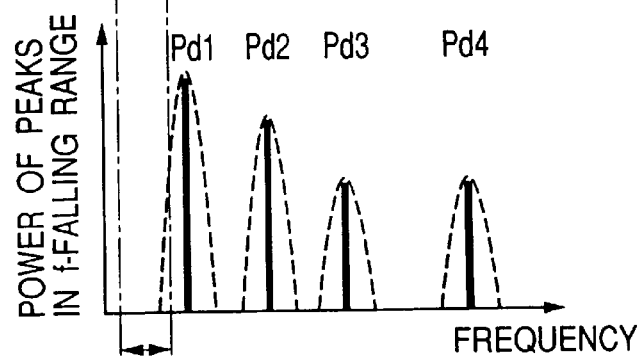

Here, consider an example as shown in FIGS. 14(a) and 14(b). Pu1, Pu2, Pu3, and Pu4 indicate spectrum peaks in the modulated frequency rising range, while Pd1, Pd2, Pd3, and Pd4 indicate spectrum peaks in the modulated frequency falling range. Assume that the spectrum peaks Pu1 to Pu3 and Pd1 to Pd3 arise from a stationary object, while the spectrum peaks Pu4 and Pd4 arise from a moving object. If the spectrum peaks Pd1 to Pd4 in the modulated frequency falling range are shifted by the frequency shifts Sn−1, Sn, and Sn+1, they will be broken down into three spectrum groups, as shown in FIG. 15(b).

The evaluation value |Vp| is determined using each of pairs of spectrum peaks in the modulated frequency rising and falling ranges in each of the spectrum groups.

(2) Next, the evaluation values |Vp| in each of the spectrum groups are summed up to determine the sum SUMVp. One of the sums SUMVp which has the smallest value is selected to determine a corresponding one of the frequency shifts Sn and Sn±1. In the example shown in FIGS. 15(a) and 15(b), the middle spectrum group shows the smallest sum SUMVp. The frequency shift Sn is, thus, selected as the optimum frequency shift TSn.

The stationary object-identifying operation executed in the second embodiment will be explained in more detail with reference to FIG. 16.

After entering the program, the routine proceeds to step 400 wherein the second corrected basic frequency shifts are determined using the equation (5) in the manner as described above.

The routine proceeds to step 410 wherein if the second corrected basic frequency shifts determined in step 400 are three frequency shifts Sn−1, Sn, and Sn+1, the whole of the spectrum in the modulated frequency falling range is moved in the first program cycle by the frequency shift Sn−1. Similarly, it is moved in the second and third program cycles by the frequency shifts Sn and Sn+1, respectively.

The routine proceeds to step 420 wherein the evaluation values |Vp| are determined in sequence according to the equations (6) and (7) using peak frequency components in the modulated frequency falling range shifted in step 410 and peak frequency components in the modulated frequency rising range.

The routine proceeds to step 440 wherein it is determined whether as many evaluation values |Vp| as pairs of the peak frequency components in the modulated frequency rising and falling ranges have been calculated or not. For example, if there are four pairs of peak frequency components in the left spectrum group, as shown in FIGS. 15(*a*) and 15(*b*), it is determined whether the evaluation values |Vp| have been calculated based on all the four pairs or not. If a NO answer is obtained, then the routine returns back to step 420. Alternatively, if a YES answer is obtained, then the routine proceeds to step 450 wherein the evaluation values |Vp| derived in step 420 are summed up to determine the sum SUMVp.

The routine proceeds to step 460 wherein it is determined whether the spectrum in the modulated frequency falling range has been shifted a given number of times or not. For example, if the second corrected basic frequency shifts determined in step 400 are three frequency shifts Sn−1, Sn, and Sn+1, as shown in the example of FIGS. 15(*a*) and 15(*b*), it is determined whether the spectrum in the modulated frequency falling range has been moved by the frequency shifts Sn−1, Sn, and Sn+1 to form three spectrum groups or not. If a NO answer is obtained, then the routine returns back to step 410. Alternatively, if a YES answer is obtained, then the routine proceeds to step 470 wherein all the sums SUMVp determined so far in step 450 are compared to determine one of the second corrected basic frequency shifts determined in step 400 which corresponds to the smallest of the sums SUMVp as the optimum frequency shift TSn.

The routine proceeds to step 480 wherein it is determined whether one of the evaluation values |Vp| determined based on the pairs of peak frequency components in the spectrum group to which the peak frequency components in the modulated frequency falling range moved by the optimum frequency shift TSn belong is smaller than the threshold value Thp1 or not. If a YES answer is obtained, then the routine proceeds to step 490. Alternatively, if a NO answer is obtained, then the routine proceeds to step 520.

In step 520, it is determined that a measure of agreement between corresponding peak frequency components in the modulated frequency rising and falling ranges is low and that a target creating these peak frequency components is a moving object. The moving object flag is, thus, set. The routine then proceeds to step 530.

In step 490, it is determined whether the estimated moving object flag is set or not at a location where the corresponding peak frequency components in the modulated frequency rising and falling ranges exist. If a NO answer is obtained, then the routine proceeds to step 500 wherein it is determined that the target is a stationary object, and the stationary object flag is set. Alternatively, if a YES answer is obtained, then the routine proceeds to step 510 wherein at least one of the peak frequency components corresponding to the evaluation value |Vp| used in the determination in step 480 is a mixture of peak frequency components arising from both moving and stationary objects, and the mixed peak flag is set.

After step 500, 510, or 520, the routine proceeds to step 530 wherein it is determined whether the operations in steps 480 to 520 have been completed using all of the evaluation values |Vp| or not. If a NO answer is obtained, then the routine returns back to step 480 wherein it is determined whether another one of the evaluation values |Vp| is smaller than the threshold value Thp1 or not. Alternatively, if a YES answer is obtained in step 530, then the routine terminates.

The third embodiment will be described below.

Figure 17A:
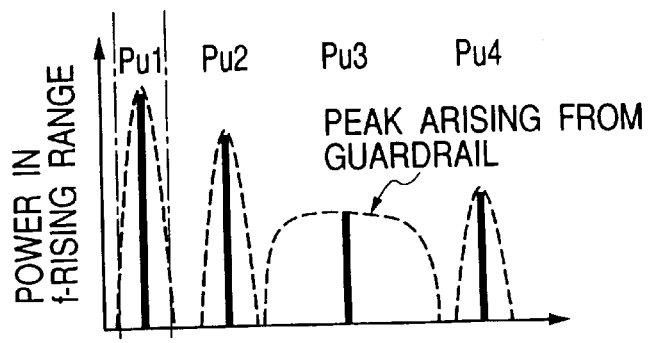
FIG. 17(*a*) illustrates frequency peaks in a modulated frequency rising range when there is a guardrail in a radar detection zone.
Figure 17B:
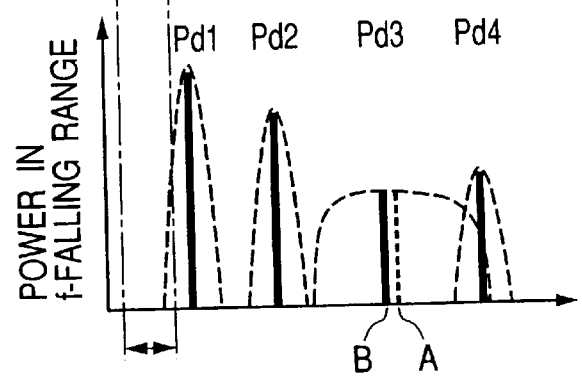

Usually, frequency components in the modulated frequency rising and falling ranges arising from a guardrail installed on the side of a road have, as shown in FIGS. 17(*a*) and 17(*b*), wider waveforms, respectively, whose peaks may not coincide with each other, as indicated by A and B in FIG. 17(*b*). In order to avoid this problem, the third embodiment is designed to use a peak of a portion of a frequency component in the modulated frequency falling range within a bandwidth Pw selected across a peak of a corresponding one of frequency components in the modulated frequency rising range in determining the evaluation value |Vp|.

(1) First, the length of the vector sum Vp of the amplitude evaluation value Y and the phase difference evaluation value X is, like the first embodiment, determined as the evaluation value |Vp|.

Here, consider an example as shown in FIGS. 15(*a*) and 15(*b*). Pu1, Pu2, Pu3, and Pu4 indicate spectrum peaks in the modulated frequency rising range, while Pd1, Pd2, Pd3, and Pd4 indicate spectrum peaks in the modulated frequency falling range. Assume that the spectrum peaks Pu1 to Pu3 and Pd1 to Pd3 arise from a stationary object, while the spectrum peaks Pu4 and Pd4 arise from a moving object. If the spectrum peaks Pd1 to Pd4 in the modulated frequency falling range are shifted by the frequency shift Sn, they will be ones shown in FIG. 18(*b*).

First, all possible combinations of the peak of each of the frequency components in the modulated frequency rising range, as shown in FIG. 18(*a*), and frequency elements of a corresponding one of the frequency components in the modulated frequency falling range, as shown in FIG. 18(*b*), which are defined within a bandwidth of ±Pw/2 across the peak of the corresponding frequency component in the modulated frequency rising range are provided. Next, using each of the combinations, the evaluation value |Vp| is determined. In this embodiment, the level of the peak of each frequency component is stored in the RAM 26*c*, but the levels of other portions of each frequency component are not stored. Therefore, the evaluation value |Vp| determined using one of the combinations which is made up of both the peaks of the frequency components in the modulated frequency rising and falling ranges has the smallest value and is used in determining the type of a target, as discussed below.

Figure 19:
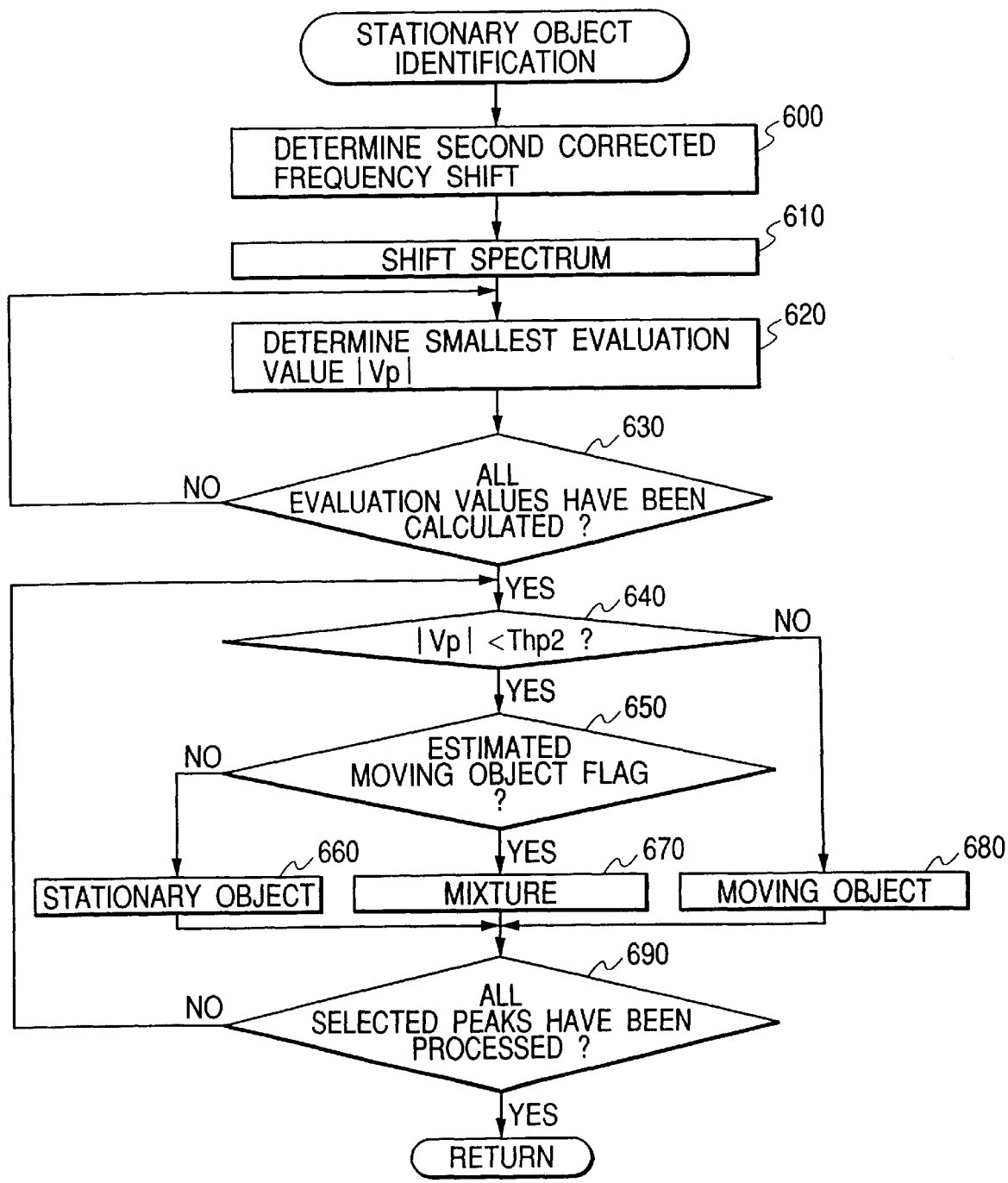
FIG. 19 is a flowchart of a program for determining the type of a target according to the third embodiment of the invention.

The stationary object-identifying operation executed in the third embodiment will be explained in more detail with reference to FIG. 19.

After entering the program, the routine proceeds to step 600 wherein the second corrected basic frequency shifts are determined using the equation (5) in the manner as described above.

The routine proceeds to step 610 wherein if the second corrected basic frequency shifts determined in step 600 are three frequency shifts Sn−1, Sn, and Sn+1, the spectrum in the modulated frequency falling range is moved only by the basic frequency shift Sn.

The routine proceeds to step 620 wherein the evaluation values |Vp| are determined in the above manner using peak frequency components in the modulated frequency falling range shifted in step 610 and peak frequency components in the modulated frequency rising range. Specifically, the evaluation value |Vp| which has the smallest value in each bandwidth of ±Pw/2 is selected.

The routine proceeds to step 630 wherein it is determined whether as many evaluation values |Vp| as selected pairs of the peak frequency components in the modulated frequency rising and falling ranges have been calculated or not. For example, if there are four pairs of peak frequency components, as shown in FIGS. 18(*a*) and 18(*b*), it is determined whether the evaluation values |Vp| have been calculated based on all the four pairs or not. If a NO answer is obtained, then the routine returns back to step 620. Alternatively, if a YES answer is obtained, then the routine proceeds to step 640 wherein the evaluation values |Vp| derived in step 620

The routine proceeds to step 640 wherein it is determined whether one of the evaluation values |Vp| determined based on the pairs of peak frequency components is smaller than the threshold value Thp2 or not. If a YES answer is obtained, then the routine proceeds to step 650. Alternatively, if a NO answer is obtained, then the routine proceeds to step 680.

In step 680, it is determined that a measure of agreement between corresponding peak frequency components in the modulated frequency rising and falling ranges is low and that a target creating these peak frequency components is a moving object. The moving object flag is, thus, set. The routine then proceeds to step 690.

In step 650, it is determined whether the estimated moving object flag is set at a location or not where the corresponding peak frequency components in the modulated frequency rising and falling ranges exist. If a NO answer is obtained, then the routine proceeds to step 660 wherein it is determined that the target is a stationary object, and the stationary object flag is set. Alternatively, if a YES answer is obtained, then the routine proceeds to step 670 wherein at least one of the peak frequency components corresponding to the evaluation value |Vp| used in the determination in step 640 is a mixture of peak frequency components arising from both moving and stationary objects, and the mixed peak flag is set.

After step 660, 670, or 680, the routine proceeds to step 690 wherein it is determined whether the operations in steps 640 to 680 have been completed using all of the evaluation values |Vp| or not. If a NO answer is obtained, then the routine returns back to step 640 wherein it is determined whether another one of the evaluation values |Vp| is smaller than the threshold value Thp2 or not. Alternatively, if a YES answer is obtained in step 690, then the routine terminates.

The fourth embodiment will be described below which is different from the third embodiment only in a manner in which the evaluation values |Vp| are determined. Other operations are identical, and explanation thereof in detail will be omitted here.

In the third embodiment, the whole of the spectrum in the modulated frequency falling range is shifted by the basic frequency shift (e.g., Sn), but in this embodiment, spectrum peaks in the modulated frequency falling range are shifted, in sequence, by Sn±Pw/2.

Specifically, as shown in FIG. 18(*d*), for example, the spectrum peak C in the modulated frequency falling range is shifted within a range of by Sn±Pw/2 to determine one of the evaluation values |Vp| having the smallest value in the same manner as that in the third embodiment.

Figure 20:
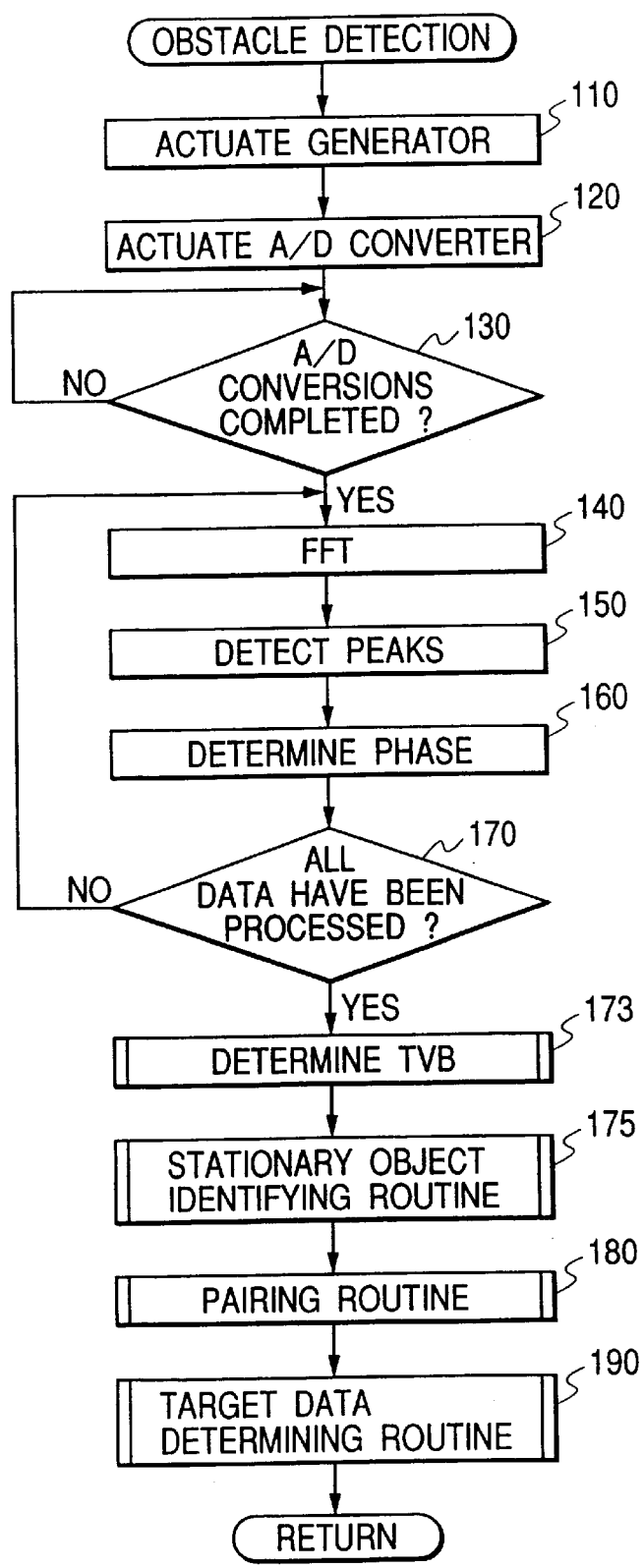
FIG. 20 is a flowchart of a program for determining the distance to, relative speed, and angular direction of a radar-detected object according to the fifth embodiment of the invention.

FIG. 20 shows an obstacle detection program executed by the microcomputer 26 according to the fifth embodiment which is different from the one shown in FIG. 7 only in step 173. Other steps are identical, and explanation thereof in detail will be omitted here.

In step 173, the actual vehicle speed TVB is estimated in the following manner for compensating for an error in output of the vehicle speed sensor 3*b*.

First, the optimum frequency shift Tsn is determined in the same manner as that in the first embodiment using the equations (3) to (9).

Next, the actual vehicle speed TVB is calculated according to the equation (11) below which is derived by rewriting the equation (10) below which is obtained by replacing the left side of the equation (3) with the optimum frequency shift Tsn and VB on the right side with TVB.

$$Tsn=(4 \cdot TVB \cdot f0)/C \quad (10)$$

$$TVB=Tsn \cdot C/(4 \cdot f0) \quad (11)$$

The difference between an actual vehicle speed TVBn calculated in this operation cycle of the microcomputer 26 and an actual vehicle speed TVBn−1 calculated one operation cycle earlier may be divided by a given time interval ΔT to find an actual acceleration dTVB of the vehicle for correcting the frequency shift Tsn. For example, the second corrected frequency shifts may be determined using an equation obtained by substituting an average value of VB and YVB into VB in the equation (5) where YVB is the vehicle speed estimated using the actual acceleration dTVB.

The estimation of the actual vehicle speed TVB and stationary object identification will be described below with reference to FIGS. 21 and 22. The same numbers as employed in those in the flowchart of FIG. 13 refer to the same steps, and explanation thereof in detail will be omitted here.

Figure 21:
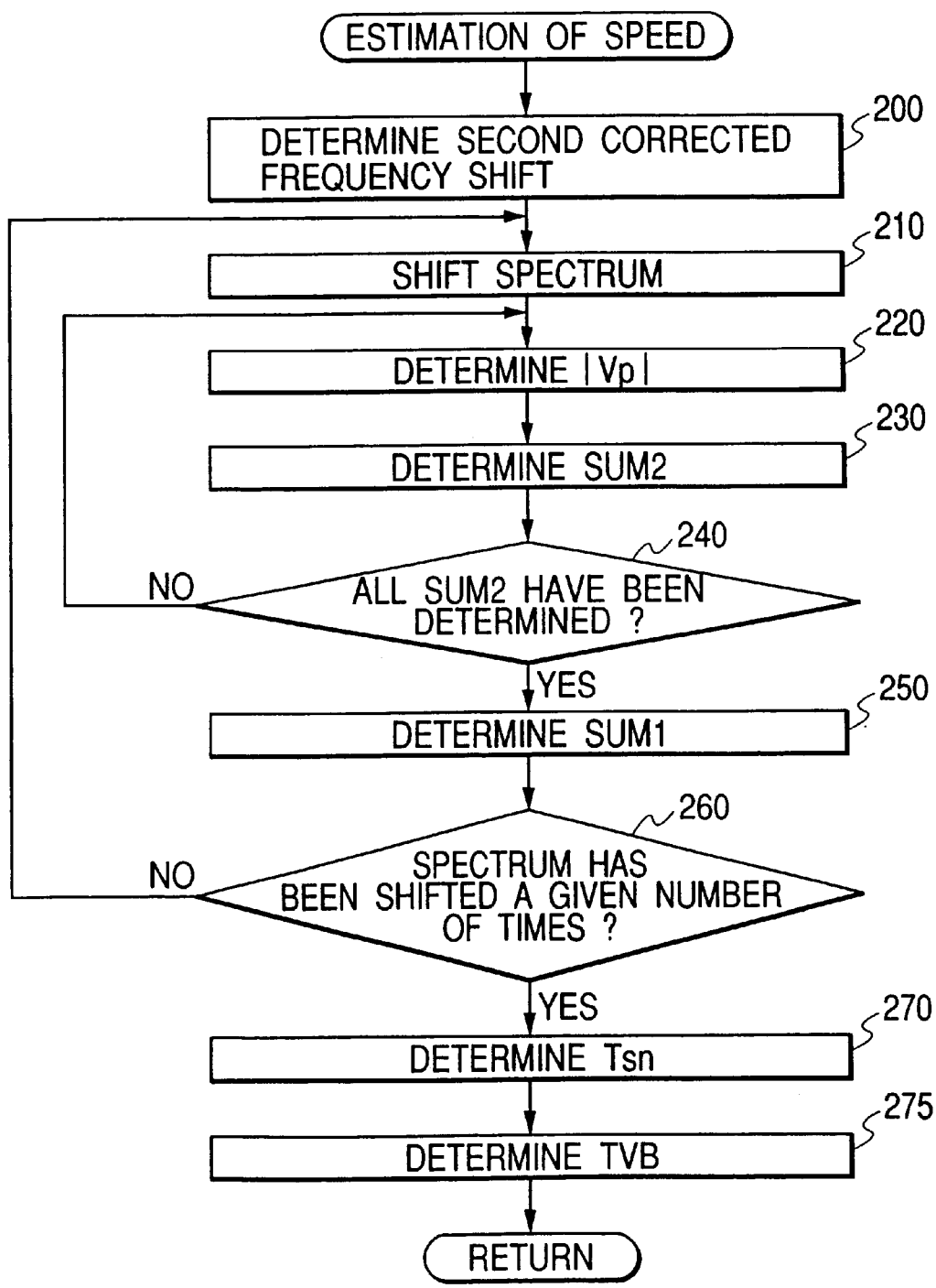
FIG. 21 is a flowchart of a program for estimating an actual speed of a vehicle according to the fifth embodiment.
Figure 22:
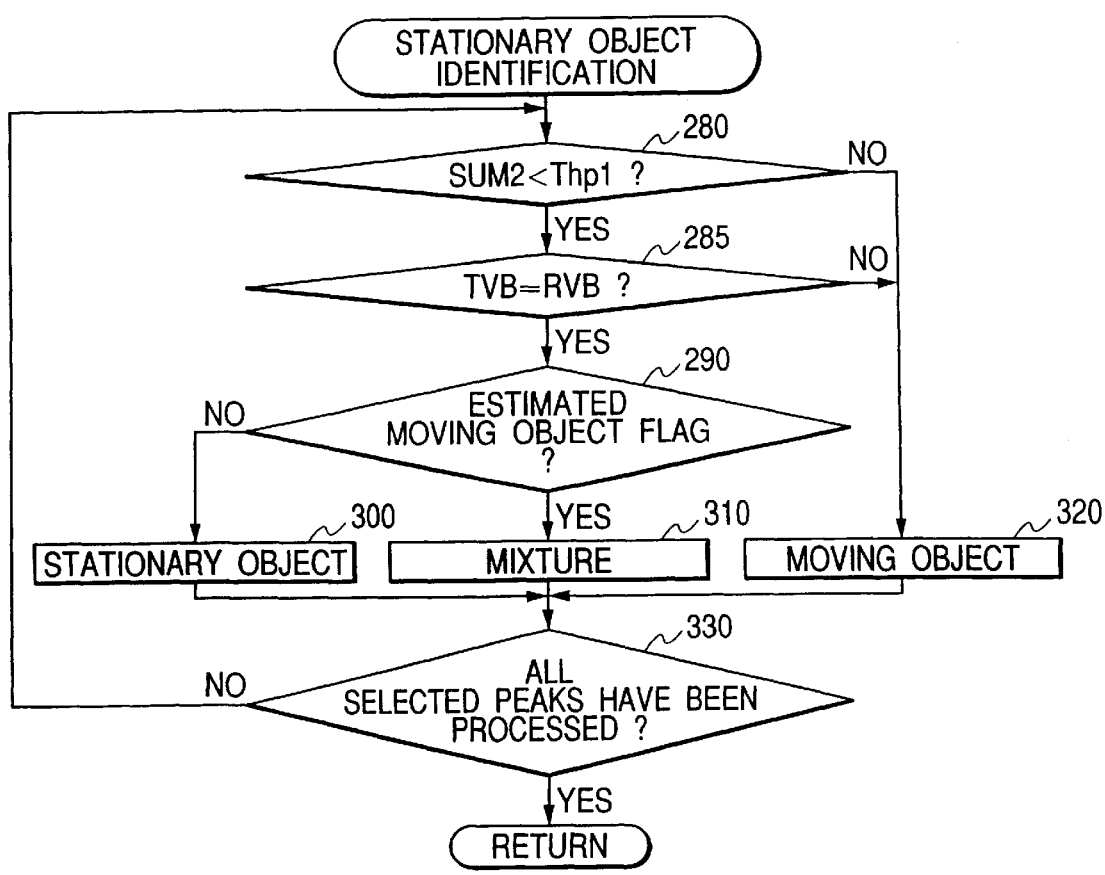
FIG. 22 is a flowchart of a program for determining the type of a target according to the fifth embodiment.

After the optimum frequency shift Tsn is determined in step 270 of FIG. 21, the routine proceeds to step 275 wherein the actual vehicle speed TVB is estimated in the manner, as described above. The vehicle control system 1 uses the actual vehicle speed TVB in the anti-collision control, the radar cruise control, and/or the anti-skid control.

The routine proceeds to step 280 wherein it is determined whether a selected one of the sums SUM2 determined in step 230 is smaller than the threshold value Thp or not. If a NO answer is obtained, then the routine proceeds to step 320. Alternatively, if a YES answer is obtained, then the routine proceeds to step 285 wherein it is determined whether the actual vehicle speed TVB lies within a preselected range defined across the relative speed V between a target and the vehicle equipped with the radar 2 determined based on the equation (1) or not. If a NO answer is obtained, then the routine proceeds to step 320. Alternatively, if a YES answer is obtained, then the routine proceeds to step 320 wherein it is determined whether the estimated moving object flag is set or not. The subsequent steps are, as described above, identical with those in FIG. 13, and explanation thereof in detail will be omitted here.

As can be seen from the above discussion, the fifth embodiment determines an accurate actual vehicle speed and uses it in determining the type of a target tracked by the radar 2. It, thus, becomes possible to recognize stationary obstacles present ahead of the vehicle with high accuracy.

The above described programs executed by the CPU 26*a* of the microcomputer 26 may alternatively be stored in a storage such as a microchip, a floppy disc, a hard disc, or an optical disc.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. An FM-CW radar apparatus for a vehicle comprising:
a radar wave transmitter transmitting a radar wave having a frequency modulated so as to increase at a given rate and decrease at a given rate cyclically;
a radar wave receiver receiving a return of the radar wave from a target object present in a radar detection zone to mix the return of the radar wave with the radar wave transmitted from said radar wave transmitter to produce a beat signal;

a spectrum producing circuit producing a first spectrum using a portion of the beat signal in a frequency rising range wherein the frequency of the radar wave transmitted from said radar wave transmitter increases and a second spectrum using a portion of the beat signal in a frequency falling range wherein the frequency of the radar wave decreases;

a frequency shift determining circuit determining a plurality of frequency shifts for shifting one of the first and second spectra as a function of an output of a speed sensor measuring a speed of a vehicle equipped with the FM-CW radar, said frequency shift determining circuit correcting the frequency shifts for compensating for an error in the output of the speed sensor;

a frequency moving circuit moving frequency components having peaks in one of the first and second spectra by the corrected frequency shifts to form spectrum groups each consisting of the frequency components moved by one of the corrected frequency shifts and frequency components having peaks in the other of the first and second spectra;

a matching determining circuit determining a measure of matching between a spectrum made up of the moved frequency components and the other of the first and second spectra in each of the spectrum groups to select one of the spectrum groups showing the highest measure of matching;

an optimum frequency shift determining circuit determining one of the frequency shifts determined by said frequency shift determining circuit corresponding to the one of the spectrum groups selected by said matching determining circuit as an optimum frequency shift; ands a target motion determining circuit determining a state of motion of the target object based on the frequency components in the frequency rising and falling ranges in the one of the spectrum groups corresponding to the optimum frequency shift.

2. An FM-CW radar apparatus as set forth in claim 1, wherein the frequency shifts determined by said frequency shift determining circuit are a basic frequency shift determined as a function of the speed of the vehicle and sub-frequency shifts different from the basic frequency shift by given amount.

3. An FM-CW radar apparatus as set forth in claim 1, wherein said frequency moving circuit pairs each of the moved frequency components in the one of the first and second spectra with a corresponding one of the frequency components in the other of the first and second spectra in each of the spectrum group, and wherein said matching determining circuit determines a measure of matching between the frequency components of each pair in each of the spectrum groups to select the one of the spectrum groups showing the highest measure of matching.

4. An FM-CW radar apparatus as set forth in claim 3, wherein said target motion determining circuit determines whether the target object is a stationary object or not based on each measure of matching between one of the frequency components in the first spectrum and a corresponding one of the frequency components in the second spectrum paired in the one of the spectrum groups corresponding to the optimum frequency shift.

5. An FM-CW radar apparatus as set forth in claim 3, wherein said matching determining circuit determines the measure of matching between portions of the frequency components paired in each of the spectrum groups within a preselected bandwidth across each of the peaks of the frequency components.

6. An FM-CW radar apparatus as set forth in claim 3, wherein said matching determining circuit determines the measure of matching between the frequency components based on information on an amplitude of each of the frequency components and an azimuth angle of the target object.

7. An FM-CW radar apparatus as set forth in claim 6, wherein said radar wave receiver has two receiving channels, and wherein said information is given by an absolute value of a vector sum of an amplitude evaluation value determined by the amplitude of each of the frequency components and a phase difference evaluation value determined by a phase difference between the frequency components derived through the two receiving channels.

8. An FM-CW radar apparatus as set forth in claim 3, wherein said radar wave receiver has two receiving channels, and wherein said matching determining circuit calculates an absolute value of a vector sum of an amplitude evaluation value determined by an amplitude of each of frequency elements defined across the peak of each of the frequency components within a given bandwidth and a phase difference evaluation value determined by a phase difference between corresponding two of the frequency elements of the frequency components derived through the two receiving channels and sums up the absolute values of the vector sums in each of the frequency components to produce a first sum value, said matching determining circuit also summing up the first sum values in each of the spectrum groups to produce a second sum value and selecting one of the spectrum groups showing the smallest of the second sum values as the one showing the highest measure of matching.

9. An FM-CW radar apparatus as set forth in claim 8, wherein said target motion determining circuit determines that the target object is a stationary object when a selected one of the first sum values is smaller than a threshold value.

10. An FM-CW radar apparatus as set forth in claim 1, wherein said frequency shift determining circuit also determines the frequency shifts as a function of an angular direction of the radar wave transmitted from said radar wave transmitter.

11. An FM-CW radar apparatus as set forth in claim 1, wherein said target motion determining circuit determines, in a cycle, whether the target object is a stationary object or a moving object, estimates a position at which the frequency component arising from the target object determined as the moving object would exist in a subsequent cycle, and sets an estimated moving object flag at said position, and wherein said target motion determining circuit does not determine, in the subsequent cycle, the target object as the stationary object based on the frequency component appearing at the position at which the estimated moving object flag is set.

12. An FM-CW radar as set forth in claim 1, wherein said matching determining circuit determines the measure of matching based on information on peaks of the frequency components.

13. An FM-CW radar apparatus as set forth in claim 12, wherein said information is information on one of frequencies of the peaks, levels of the peaks, and phase differences of the peaks.

14. An FM-CW radar for a vehicle comprising:
a radar wave transmitter transmitting a radar wave in the form of a radar beam which has a frequency modulated so as to increase at a given rate and decrease at a given rate cyclically;
a radar wave receiver receiving a return of the radar wave from a target object present in a radar detection zone to mix the return of the radar wave with the radar wave transmitted from said radar wave transmitter to produce a beat signal;

a spectrum producing circuit producing a first spectrum using a portion of the beat signal in a frequency rising range wherein the frequency of the radar wave transmitted from said radar wave transmitter increases and a second spectrum using a portion of the beat signal in a frequency falling range wherein the frequency of the radar wave decreases;

a frequency shift determining circuit determining a frequency shifts for shifting one of the first and second spectra as a function of an output of a speed sensor measuring a speed of a vehicle equipped with the FM-CW radar, said frequency shift determining circuit correcting the frequency shift as a function of an angular direction of the radar beam transmitted from said radar wave transmitter;

a frequency moving circuit moving frequency components having peaks in one of the first and second spectra by the corrected frequency shift to pair each of the moved frequency components in the one of the first and second spectra with a corresponding one of the frequency components in the other of the first and second spectra; and a target motion determining circuit determining a state of motion of the target object based on the frequency components paired by said frequency moving circuit.

15. An FM-CW radar apparatus as set forth in claim 14, further comprising a matching determining circuit determining a measure of matching between the frequency components forming each pair, and wherein said target motion determining circuit determines the state of motion of the target object based on the measures of matching determined by said matching determining circuit.

16. An FM-CW radar apparatus as set forth in claim 15, wherein said matching determining circuit determines the measure of matching between portions of the paired frequency components within a preselected bandwidth across each of the peaks of the frequency components.

17. An FM-CW radar apparatus as set forth in claim 15, wherein said matching determining circuit determines the measure of matching between the frequency components based on information on an amplitude of each of the frequency components and an azimuth angle of the target object.

18. An FM-CW radar apparatus as set forth in claim 17, wherein said radar wave receiver has two receiving channels, and wherein said information is given by an absolute value of a vector sum of an amplitude evaluation value determined by the amplitude of each of the frequency components and a phase difference evaluation value determined by a phase difference between the frequency components derived through the two receiving channels.

19. An FM-CW radar apparatus as set forth in claim 17, wherein said radar wave receiver has two receiving channels and wherein said matching determining circuit calculates an absolute value of a vector sum of an amplitude evaluation value determined by an amplitude of each of frequency elements defined across the peak of each of the frequency components within a given bandwidth and a phase difference evaluation value determined by a phase difference between corresponding two of the frequency elements of the frequency components derived through the two receiving channels and sums up the absolute values of the vector sums in each of the frequency components to produce a sum value, and wherein said target motion determining circuit determines that the target object is the stationary object when a selected one of the sum values is smaller than a threshold value.

20. An FM-CW radar apparatus as set forth in claim 14, wherein said target motion determining circuit determines, in a cycle, whether the target object is a stationary object or a moving object, estimates a position at which the frequency component arising from the target object determined as the moving object would exist in a subsequent cycle, and sets an estimated moving object flag at said position, and wherein said target motion determining circuit does not determine, in the subsequent cycle, the target object as the stationary object based on the frequency component appearing at the position at which the estimated moving object flag is set.

21. An FM-CW radar as set forth in claim 15, wherein said matching determining circuit determines the measure of matching based on information on peaks of the paired frequency components.

22. An FM-CW radar apparatus as set forth in claim 21, wherein said information is information on one of frequencies of the peaks, levels of the peaks, and phase differences of the peaks.

23. An FM-CW radar comprising:

a radar wave transmitter transmitting a radar wave in the form of a radar beam which has a frequency modulated so as to increase at a given rate and decrease at a given rate cyclically;

a radar wave receiver receiving a return of the radar wave from a target object present in a radar detection zone to mix the return of the radar wave with the radar wave transmitted from said radar wave transmitter to produce a beat signal;

a spectrum producing circuit producing a first spectrum using a portion of the beat signal in a frequency rising range wherein the frequency of the radar wave transmitted from said radar wave transmitter increases and a second spectrum using a portion of the beat signal in a frequency falling range wherein the frequency of the radar wave decreases;

a frequency moving circuit moving frequency components having peaks in one of the first and second spectra by a preselected frequency shift to pair each of the moved frequency components in the one of the first and second spectra with a corresponding one of the frequency components in the other of the first and second spectra;

a matching determining circuit determining a measure of matching between the frequency components forming each pair based on information on an amplitude of each of the frequency components and an azimuth angle of the target object; and a target motion determining circuit determining a state of motion of the target object based on the measures of matching determined by said matching determining circuit.

24. An FM-CW radar apparatus as set forth in claim 23, wherein said matching determining circuit determines the measure of matching between portions of the paired frequency components within a preselected bandwidth across each of the peaks of the frequency components.

25. An FM-CW radar apparatus as set forth in claim 23, wherein said radar wave receiver has two receiving channels, and wherein said information is given by an absolute value of a vector sum of an amplitude evaluation value determined by the amplitude of each of the frequency components and a phase difference evaluation value determined by a phase difference between the frequency components derived through the two receiving channels.

26. An FM-CW radar apparatus as set forth in claim 23, wherein said radar wave receiver has two receiving channels, and wherein said matching determining circuit calculates an absolute value of a vector sum of an amplitude evaluation value determined by an amplitude of each of frequency elements defined across the peak of each of the frequency components within a given bandwidth and a phase difference evaluation value determined by a phase difference between corresponding two of the frequency elements of the frequency components derived through the two receiving channels and sums up the absolute values of the vector sums in each of the frequency components to produce a sum value, and wherein said target motion determining circuit determines that the target object is the stationary object when a selected one of the sum values is smaller than a threshold value.

27. An FM-CW radar apparatus as set forth in claim 23, wherein said target motion determining circuit determines, in a cycle, whether the target object is a stationary object or a moving object, estimates a position at which the frequency component arising from the target object determined as the moving object would exist in a subsequent cycle, and sets an estimated moving object flag at said position, and wherein said target motion determining circuit does not determine, in the subsequent cycle, the target object as the stationary object based on the frequency component appearing at the position at which the estimated moving object flag is set.

28. An FM-CW radar as set forth in claim 23, wherein said matching determining circuit determines the measure of matching based on information on peaks of the paired frequency components.

29. An FM-CW radar apparatus as set forth in claim 28, wherein said information is information on one of frequencies of the peaks, levels of the peaks, and phase differences of the peaks.

30. An FM-CW radar comprising:
a radar wave transmitter transmitting a radar wave in the form of a radar beam which has a frequency modulated so as to increase at a given rate and decrease at a given rate cyclically;
a radar wave receiver receiving a return of the radar wave from a target object present in a radar detection zone to mix the return of the radar wave with the radar wave transmitted from said radar wave transmitter to produce a beat signal;
a spectrum producing circuit producing a first spectrum using a portion of the beat signal in a frequency rising range wherein the frequency of the radar wave transmitted from said radar wave transmitter increases and a second spectrum using a portion of the beat signal in a frequency falling range wherein the frequency of the radar wave decreases;
a frequency moving circuit moving frequency components having peaks in one of the first and second spectra by a preselected frequency shift to pair each of the moved frequency components in the one of the first and second spectra with a corresponding one of the frequency components in the other of the first and second spectra; and
a target motion determining circuit comparing the frequency components forming each pair to determine a state of motion of the target object, said target motion determining circuit determining, in a cycle, whether the target object is a stationary object or a moving object, estimating a position at which the frequency component arising from the target object determined as the moving object would exist in a subsequent cycle, and setting an estimated moving object flag at said position, said target motion determining circuit not determining, in the subsequent cycle, the target object as the stationary object based on the frequency component appearing at the position at which the estimated moving object flag is set.

31. An FM-CW radar apparatus for a vehicle comprising:
a radar wave transmitter transmitting a radar wave having a frequency modulated so as to increase at a given rate and decrease at a given rate cyclically;
a radar wave receiver receiving a return of the radar wave from a target object present in a radar detection zone to mix the return of the radar wave with the radar wave transmitted from said radar wave transmitter to produce a beat signal;
a spectrum producing circuit producing a first spectrum using a portion of the beat signal in a frequency rising range wherein the frequency of the radar wave transmitted from said radar wave transmitter increases and a second spectrum using a portion of the beat signal in a frequency falling range wherein the frequency of the radar wave decreases;
a frequency shift determining circuit determining a frequency shift for shifting one of the first and second spectra as a function of a speed of a vehicle equipped with the FM-CW radar;
a frequency moving circuit moving frequency components having peaks in one of the first and second spectra by the frequency shift to form pairs each consisting of one of the frequency components moved by the frequency shift and a corresponding one of frequency components having peaks in the other of the first and second spectra;
a matching determining circuit determining a measure of matching between a spectrum made up of the frequency components moved by said frequency moving circuit and the other of the first and second spectra based on information on portions of the frequency components within a preselected bandwidth across each of the peaks of the frequency components in one of the first and second spectra selected as a reference; and
a target motion determining circuit determining a state of motion of the target object based on the pairs of the frequency components.

32. An FM-CW radar apparatus for a vehicle comprising:
a radar wave transmitter transmitting a radar wave having a frequency modulated so as to increase at a given rate and decrease at a given rate cyclically;
a radar wave receiver receiving a return of the radar wave from a target object present in a radar detection zone to mix the return of the radar wave with the radar wave transmitted from said radar wave transmitter to produce a beat signal;
a spectrum producing circuit producing a first spectrum using a portion of the beat signal in a frequency rising range wherein the frequency of the radar wave transmitted from said radar wave transmitter increases and a second spectrum using a portion of the beat signal in a frequency falling range wherein the frequency of the radar wave decreases;
a frequency shift determining circuit determining a frequency shift for shifting one of the first and second spectra as a function of a speed of a vehicle equipped with the FM-CW radar;

a frequency moving circuit moving frequency components having peaks in one of the first and second spectra within a range of the frequency shift±a given frequency band; and a matching determining circuit determining a measure of matching between a spectrum made up of the frequency components moved by said frequency moving circuit and the other of the first and second spectra based on information on the peaks of the frequency components of the first and second spectra.

33. An FM-CW radar apparatus as set forth in claim 32, wherein said information is information on one of frequencies of the peaks, levels of the peaks, and phase differences of the peaks.

34. An FM-CW radar apparatus as set forth in claim 32, wherein said radar wave receiver has two receiving channels, and wherein said matching determining circuit determines the measure of matching based on an absolute value of a vector sum of an amplitude evaluation value determined by the amplitude of each of the frequency components and a phase difference evaluation value determined by a phase difference between the frequency components derived through the two receiving channels.

35. An FM-CW radar apparatus as set forth in claim 34, further comprising a target motion determining circuit which determines that the target object is a stationary object when a selected one of the absolute values is smaller than a threshold value.

36. A storage medium storing means for performing operations of any one of the FM-CW radar apparatuses as set forth in claims 1, 14, 23, 30, 31, and 32.

37. An FM-CW radar apparatus for a vehicle comprising:

a radar wave transmitter transmitting a radar wave in the form of a transmit signal which has a frequency modulated so as to increase at a given rate and decrease at a given rate cyclically;

a radar wave receiver receiving a return of the radar wave from a target object present in a radar detection zone to mix the return of the radar wave with the radar wave transmitted from said radar wave transmitter to produce a beat signal;

a spectrum producing circuit producing a first spectrum using a portion of the beat signal in a frequency rising range wherein the frequency of the radar wave transmitted from said radar wave transmitter increases and a second spectrum using a portion of the beat signal in a frequency falling range wherein the frequency of the radar wave decreases;

a frequency shift determining circuit determining a plurality of frequency shifts for shifting one of the first and second spectra as a function of a speed of a vehicle equipped with the FM-CW radar measured by a speed sensor, said frequency shift determining circuit correcting the frequency shifts for compensating for an error in measurement of the speed sensor;

a frequency moving circuit moving frequency components having peaks in one of the first and second spectra by the corrected frequency shifts to form spectrum groups each consisting of the frequency components moved by one of the corrected frequency shifts and frequency components having peaks in the other of the first and second spectra;

a matching determining circuit determining a measure of matching between a spectrum made up of the moved frequency components and the other of the first and second spectra in each of the spectrum groups to select one of the spectrum groups showing the highest measure of matching;

an optimum frequency shift determining circuit determining one of the frequency shifts determined by said frequency shift determining circuit corresponding to the one of the spectrum groups selected by said matching determining circuit as an optimum frequency shift; and an estimating circuit estimating an actual speed of the vehicle by correcting the speed of the vehicle measured by the speed sensor using the optimum frequency shift.

38. An FM-CW radar apparatus as set forth in claim 37, wherein said estimating circuit estimates the actual speed of the vehicle according to an equation below $$TVB = Tsn \cdot C/(4 \cdot f0)$$

where TVB is the actual speed, Tsn is the optimum frequency shift, C is a speed of light, and f0 is a central frequency of the transmit signal.

39. An FM-CW radar apparatus as set forth in claim 37, wherein said frequency shift determining circuit corrects the frequency shifts based on the actual speed estimated by said estimating circuit.

40. An FM-CW radar apparatus as set forth in claim 37, wherein said estimating circuit estimates the actual speed in a cycle, determines an actual acceleration value based on a difference between the actual speed estimated in this cycle and the actual speed estimated one cycle earlier, and estimates an actual speed of the vehicle in a subsequent cycle, and wherein said frequency shift determining circuit corrects the frequency shifts based on the estimated actual speed in the subsequent cycle.

41. An FM-CW radar apparatus as set forth in claim 37, wherein the frequency shifts determined by said frequency shift determining circuit are a basic frequency shift determined as a function of the speed of the vehicle and sub-frequency shifts different from the basic frequency shift by given amount.

42. An FM-CW radar apparatus as set forth in claim 37, wherein said frequency shift determining circuit also determines the frequency shifts as a function of an angular direction of the radar wave transmitted from said radar wave transmitter.

43. An FM-CW radar apparatus as set forth in claim 37, wherein said frequency moving circuit pairs each of the moved frequency components in the one of the first and second spectra with a corresponding one of the frequency components in the other of the first and second spectra in each of the spectrum group, and wherein said matching determining circuit determines a measure of matching between the frequency components forming each pair in each of the spectrum groups to select the one of the spectrum groups showing the highest measure of matching.

44. An FM-CW radar apparatus as set forth in claim 43, further comprising a target motion determining circuit which determines whether the target object is a stationary object or not based on each measure of matching between one of the frequency components in the first spectrum and a corresponding one of the frequency components in the second spectrum paired in the one of the spectrum groups corresponding to the optimum frequency shift.

45. An FM-CW radar apparatus as set forth in claim 44, wherein said target motion determining circuit determines, in a cycle, whether the target object is a stationary object or a moving object, estimates a position at which the frequency component arising from the target object determined as the moving object would exist in a subsequent cycle, and sets an estimated moving object flag at said position, and wherein said target motion determining circuit does not determine, in the subsequent cycle, the target object as the stationary object based on the frequency component appearing at the position at which the estimated moving object flag is set.

46. An FM-CW radar apparatus as set forth in claim 44, wherein said target motion determining circuit compares the actual speed estimated by said estimating circuit with a relative speed of the target object to the vehicle and reflects a result of the comparison on determination of whether the target object is the stationary object or the moving object.

47. An FM-CW radar apparatus as set forth in claim 37, wherein said matching determining circuit determines the measure of matching based on information on at least one of an amplitude of each of the frequency components and an azimuth angle of the target object.

48. An FM-CW radar apparatus as set forth in claim 47, wherein said radar wave receiver has two receiving channels, and wherein said information is given by an absolute value of a vector sum of an amplitude evaluation value determined by the amplitude of each of the frequency components and a phase difference evaluation value determined by a phase difference between the frequency components derived through the two receiving channels.

49. An FM-CW radar apparatus as set forth in claim 47, wherein said radar wave receiver has two receiving channels, and wherein said matching determining circuit calculates an absolute value of a vector sum of an amplitude evaluation value determined by an amplitude of each of frequency elements defined across the peak of each of the frequency components within a given bandwidth and a phase difference evaluation value determined by a phase difference between corresponding two of the frequency elements of the frequency components derived through the two receiving channels and sums up the absolute values of the vector sums in each of the frequency components to produce a first sum value, said matching determining circuit also summing up the first sum values in each of the spectrum groups to produce a second sum value and selecting one of the spectrum groups showing the smallest of the second sum values as the one showing the highest measure of matching.

50. An FM-CW radar apparatus as set forth in claim 49, further comprising a target motion determining circuit which determines that the target object is a stationary object when a selected one of the first sum values is smaller than a threshold value.

* * * * *